(12) United States Patent
Mishra

(10) Patent No.: US 10,635,660 B2
(45) Date of Patent: Apr. 28, 2020

(54) DETERMINING THE STATE OF DATA IN DATABASE APPLICATIONS

(71) Applicant: Amazon Technologies, Inc., Seattle, WA (US)

(72) Inventor: Shardool Mishra, Naini (IN)

(73) Assignee: Amazon Technologies, Inc., Seattle, WA (US)

( * ) Notice: Subject to any disclaimer, the term of this patent is extended or adjusted under 35 U.S.C. 154(b) by 196 days.

(21) Appl. No.: 15/409,458

(22) Filed: Jan. 18, 2017

(65) Prior Publication Data

US 2018/0107706 A1    Apr. 19, 2018

(30) Foreign Application Priority Data

Oct. 17, 2016    (IN) .............................. 201641035470

(51) Int. Cl.
*G06F 16/00* (2019.01)
*G06F 16/23* (2019.01)
*G06F 16/22* (2019.01)
*G06F 16/27* (2019.01)

(52) U.S. Cl.
CPC ...... *G06F 16/2379* (2019.01); *G06F 16/2282* (2019.01); *G06F 16/27* (2019.01)

(58) Field of Classification Search
CPC .................................................... G06F 21/554
See application file for complete search history.

(56) References Cited

U.S. PATENT DOCUMENTS

| 7,143,092 B1 * | 11/2006 | Gregorat | G06F 11/1658 |
| 8,775,556 B1 * | 7/2014 | Matthews | G06Q 30/0201 |
| | | | 709/217 |
| 9,239,858 B1 | 1/2016 | Willeford | |
| 2014/0181019 A1 * | 6/2014 | Bajaria | G06F 16/24556 |
| | | | 707/624 |
| 2014/0317048 A1 | 10/2014 | Wang | |
| 2014/0330767 A1 | 11/2014 | Fowler | |
| 2016/0203168 A1 | 7/2016 | Gangadharappa et al. | |

OTHER PUBLICATIONS

International Search Report and Written Opinion dated Jan. 4, 2018, International Patent Application No. PCT/US2017/056628, filed Oct. 13, 2017.
"Amazon DynamoDB Developer Guide," API Version Aug. 10, 2012, © 2017 Amazon Web Services, Inc., 758 pages.

\* cited by examiner

*Primary Examiner* — Hung Q Pham
(74) *Attorney, Agent, or Firm* — Davis Wright Tremaine LLP

(57) ABSTRACT

Techniques for determining the state of data in database applications are described herein. Changes made to a first entry in a database table are recorded and an aggregate change is determined based at least in part on a data type of a second entry associated with the first entry. The second entry is then updated based at least in part on the aggregate change.

20 Claims, 15 Drawing Sheets

DETERMINING THE STATE OF DATA IN DATABASE APPLICATIONS

CROSS-REFERENCE TO RELATED APPLICATIONS

This application claims the benefit of Indian Provisional Patent Application No. 201641035470, filed with the Indian Patent Office on Oct. 17, 2016, entitled "DATA MIGRATION," the content of which is incorporated by reference herein in its entirety.

BACKGROUND

Computer users seeking to reduce the expense and overhead associated with maintaining their own computing resources have turned to purchasing computing services offered by computing resource service providers. Such computing services are often configurable and scalable to meet various computing needs of the computer users. The use of hosted computing service and storage has proliferated in recent years where the resources for network computing and storage are often provided by computing resource providers that leverage large-scale networks of computer systems to host and execute a variety of applications and services. In such distributed computing systems with multiple distributed data centers, various customers, users, services, and resources of the computing resource service provider can generate frequent modifications to data stored by the computing resource service provider. In such distributed computing systems, it can be difficult to determine the current state of data within distributed storage systems, and even when the state is identified, reliably obtaining and maintaining eventual consistency of the data can be challenging.

BRIEF DESCRIPTION OF THE DRAWINGS

Various techniques will be described with reference to the drawings, in which.

DETAILED DESCRIPTION

Figure 1:
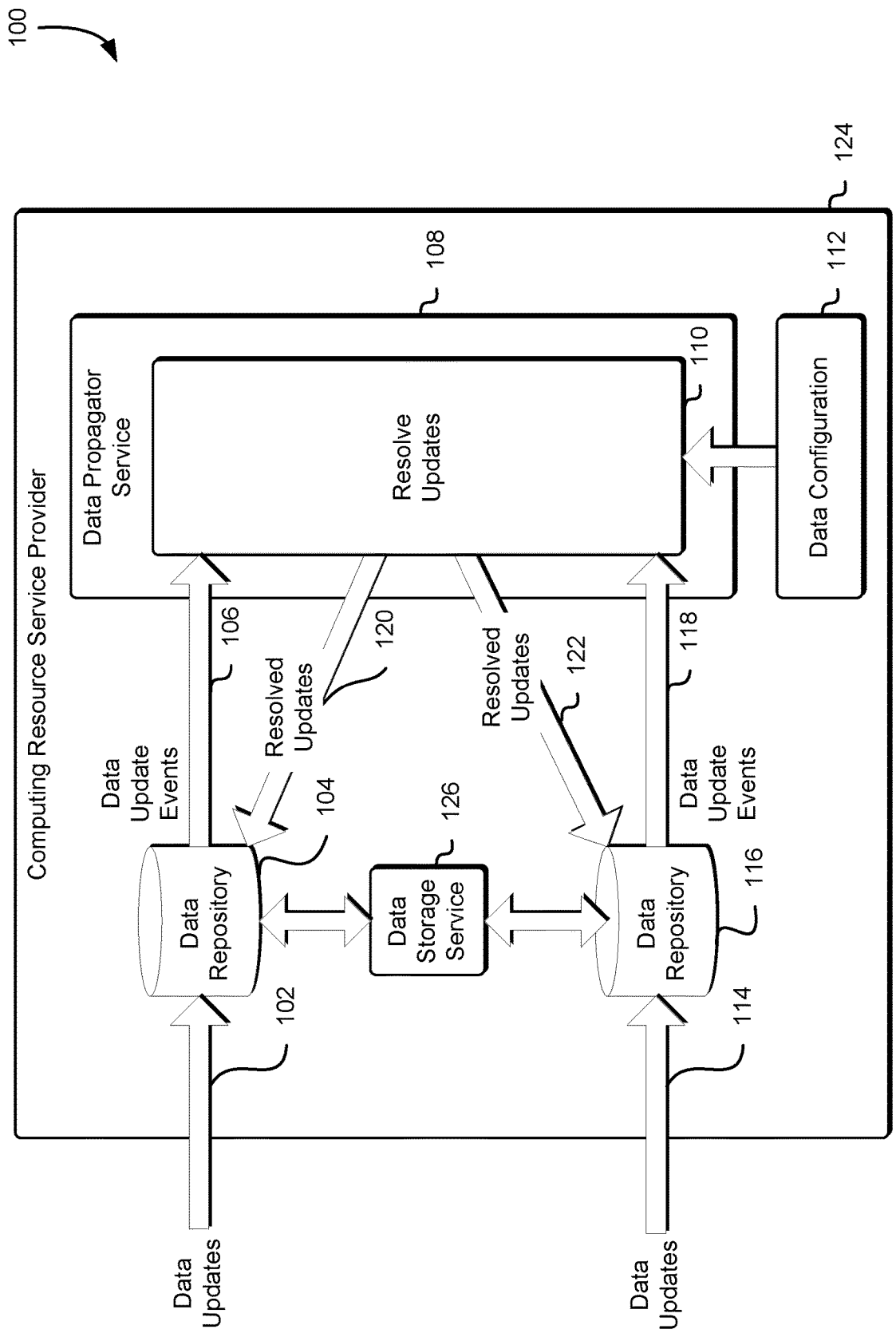
FIG. 1 illustrates an example environment where the state of data in one or more databases is maintained by a data propagator service.

In embodiments described below, a computing resource service provider provides customers with access to various computing resources to execute and/or operate various applications on behalf of the customer. In one embodiment, customers are provided with access to a database service and the database service provides customers with access to various structured query language ("SQL") and/or non-structured ("noSQL") databases. These databases can be single instance databases or can be distributed between computing resources, data centers, regions, or zones (e.g., fault zones or availability zones) of the computing resource service provider. In an example of a distributed database, a customer maintains a database across multiple different regions (e.g., one or more copies of the database maintained by computing resources in each region) to provide availability and reduced latency when accessing the database in the various regions. Writes to a database distributed across various computing resources are made to any of the different regions and thus, these distributed writes can result in inconsistencies between various data objects and/or data fields in the databases maintained on different computing resources. A data propagator service, described in greater detail below, provides a mechanism for establishing and maintaining eventual consistency of the data in these distributed databases.

In order to provide the mechanism for establishing and maintaining eventual consistency of the data in these distributed databases, a data propagator service maintains a set of data rules to determine the state of data in one or more data repositories (e.g., the databases). The state is determined by applying the set of data rules to one or more updates to the data in various repositories to resolve inconsistencies in the data updates. In one embodiment, the set of data rules to determine the state of data in one or more data repositories are specified by a customer of the computing resource provider. In one embodiment, the set of data rules to determine the state of data in one or more data repositories are specified by a service of the computing resource provider. It should be noted that, as used in the present disclosure, "customers" refer to customers of the computing resource service provider, customers of the data propagator service, and/or customers of other services of the computing resource service provider.

In one embodiment, the data propagator service receives updates to the various repositories through an event stream. When an update to a particular repository is detected by a repository record processor, the repository record processor publishes the update to a particular event stream or otherwise provides the update and/or information associated with the update to the data propagator service. For example, an update included in the event stream includes a snapshot or copy of data associated with a table key before the particular update and another snapshot or copy of data associated with a table key after the update. In this manner the updates included in the event stream include a representation of the data and also include operations of the customer that cause the data associated with a particular table key to be updated.

In one embodiment, the data propagator service determines a change in the data based at least in part on the information included in the event stream. For example, a particular event includes a data field labeled as a "counter" with a value of ten before the update and a value of eleven after the update. Based at least in part on this information, the data propagator service determines that the counter value at the time of the update was incremented from ten to eleven. In one embodiment, the data propagator service determines the state of the data based at least in part on a plurality of independent updates to distinct repositories associated with the same customer and/or database. For example, a first repository receives a first update to data associated with a particular table key and/or data identifier and a second repository receives a second update to data associated with the particular table key and/or data identifier. The data propagator service determines the state of the data associated with the particular table key and/or data identifier based at least in part on the first and the second update. To determine the state of the data, the data propagator service uses the set of data rules, as described in greater detail below. The set of data rules define various operations to determine the state of data in a database. Returning to the "counter" example above, the set of data rules define a set of operations, logic, or executable instructions for determining the state of the counter based at least in part on a plurality of updates to the counter. In this example, the data propagator service is used to maintain eventually consistency between repositories in a distributed environment and to eliminate the need for downtime or unavailability of a repository when migrating data between repositories.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where the state of data in one or more databases is maintained by a data propagator service in accordance with an embodiment. In the example environment 100 illustrated in FIG. 1, one or more data updates 102 are received at a data repository 104, and one or more data updates 114 are received at a data repository 116. As a result of the one or more data updates 102, one or more data update events 106 are generated as described herein and sent to a data propagator service 108 operating within an environment of a computing resource service provider 124. As a result of the one or more data updates 114, one or more data update events 118 are generated as described herein and sent to the data propagator service 108.

In the example environment 100 illustrated in FIG. 1, the data propagator service 108 then resolves 110 the one or more data updates 102 based at least in part on the one or more data update events 106, based at least in part on the one or more data update events 118, and also based at least in part on a data configuration 112. The resolved updates 120 and the resolved updates 122 (which in one embodiment are the same as the resolved updates 120) are then sent to the data repository 104 and the data repository 116 so that the data repository 104 and the data repository 116 contain the same data (i.e., the data repository 104 and the data repository 116 become eventually consistent).

In one embodiment, the data configuration 112 (also referred to herein as "data rules" or "data configuration rules") is a set of rules for resolving inconsistencies in data updates, which is based at least in part on the data type of the data receiving an update. In one embodiment, a data item represents a counter that increases with each update. A first update changes the value of the counter from zero to one, a second update changes the value of the counter from one to two, and so on. In such an embodiment, the data configuration 112 specifies that data updates to the counter are resolved sequentially so that each update (i.e., each increment) is applied to the counter regardless of the order received.

Using the example environment 100 illustrated in FIG. 1, the data repository 104 has a value of one for the counter and the data repository 116 has the same value (e.g., one) for the counter. When both repositories (or, in one embodiment, a quorum of repositories) have the same value at the same time, that value is referred to herein as a "synchronized value." In one embodiment, the value is a synchronized value as a result of an initial value setting or as a result of a previous resolved update. Continuing with the example illustrated in FIG. 1, the data repository 104 receives a data update to update the counter (e.g., from one to two) and the data repository 116 also receives a data update to update the counter (e.g., from one to two). It should be noted that, because the counter was synchronized, both the data repository 104 and the data repository 116 contain the same initial value (e.g., one). In the example illustrated in FIG. 1, data update events are sent to the data propagator service 108 as a result of the updates to the counter value. The data propagator service 108 then uses the data configuration 112 to resolve 110 the updates.

In one embodiment, the data propagator service 108 uses the data configuration 112 to resolve 110 the update by determining that there were two increment operations to the counter and that the resolved value should be three (e.g., one increment from one to two and one increment from two to three). In such one embodiment, the data repository 104 receives a resolved update 120 updating the value of the counter to three and the data repository 116 also receives a resolved update 122 updating the value of the counter to three.

In one embodiment, the data propagator service 108 uses the data configuration 112 to resolve 110 the update by determining that there were two identical operations to the counter and that the resolved value should be two (e.g., both increments from one to two are correct). In one embodiment, the data repository 104 receives a resolved update 120 updating the value of the counter to two, and the data repository 116 also receive a resolved update 122 updating the value of the counter to two. In one embodiment, the data propagator service 108 determines that no resolved updates need to be sent because each of the data repositories has the correct value.

The data configuration 112 may be determined by a customer of the computing resource service provider 124, may be determined by the data propagator service 108, may be determined by another service of the computing resource service provider 124, or may be determined by a combination of these. In one embodiment, the data configuration 112 is selected by a customer of the computing resource service provider 124 from a set of default rules provided by a service of the computing resource service provider 124.

In one embodiment, the data propagator service 108 is used to maintain eventual data consistency in the case of multiple data repositories such as those in the example environment 100 illustrated in FIG. 1. The multiple data repositories (e.g., the data repository 104 and the data repository 116) might be created for multiple reasons including, but not limited to, dividing the resource load or to creating availability in different regions and/or zones. With multiple users providing data updates to the multiple data repositories, data inconsistencies can result due to multiple writes to different repositories. In the example illustrated in FIG. 1, the data propagator service 108 uses the data configuration 112 to resolve the data inconsistencies and determine the value that is to be written in the multiple data repositories such that data in the multiple data repositories becomes eventually consistent. In the example illustrated in FIG. 1, when a data update event is received, the data propagator service 108 determines the changes to the data (also referred to herein as "the delta") that has happened in the given repository and stores this delta. Then at a time T1 a user or a service issues a command to synchronize all the repositories to a final consistent state. The data propagator service 108 uses the stored deltas that it has gathered over a period of time to finalize the data based on the data configuration 112, and this finalized data (also referred to here as the resolved updates) can be propagated to each of the multiple data repositories such that they will all be in consistent state. Because the data propagator service 108 keeps track of updates that are happening in the multiple data repositories, it can perform operations that determine what should be the final consistent data that can be written to each of the multiple data repositories.

In one embodiment, the data updates 102 and/or the data updates 114 are generated by a user or customer of the computing resource service provider 124 who uses a client computing device to connect to a variety of services provided by a computing resource service provider 124. The user may use the client computing device to connect to the computing resource service provider 124 over a network such as those networks described herein. As used herein a computing resource service provider 124 provides a distributed, virtualized, and/or datacenter environment within which one or more applications, processes, services, virtual machines, and/or other such computer system entities may be executed. The user may be a person, or may be a process running on one or more remote computer systems, or may be some other computer system entity, user, or process.

Commands from the user to the computing resource service provider 124 may originate from an outside computer system or from within the computing resource service provider environment. The commands to connect to the computing resource service provider 124 may be sent to the computing resource service provider 124 and/or the services operating in the environment therein, without the direct intervention of the user (i.e., commands to connect to the computing resource service provider 124 may be generated automatically in response to one or more events). The user may be a privileged user associated with a customer of the computing resource service provider 124. The user may also be a privileged user associated with the computing resource service provider 124.

In one embodiment, the computing resource service provider 124 provides access to one or more host machines, provides access to one or more virtual machine instances operating thereon, or provides access to one or more services in an environment therein. In one embodiment, the one or more services provided by the computing resource service provider 124 are implemented as and/or utilize one or more virtual machine instances that are operating on host machines operating within the computing resource service provider 124 environment. In one embodiment, the computing resource service provider 124 provides a variety of services to users and/or customers of the computing resource service provider 124. The users and/or customers of the computing resource service provider 124 can communicate with the computing resource service provider 124 via an interface such as a web services interface or any other type of interface. Each of the services operating in an environment of the computing resource service provider 124 can have its own interface and, generally, subsets of the services can have corresponding interfaces in addition to or as an alternative to the single interface.

In one embodiment, the user interacts with services of the computing resource service provider (via appropriately configured and authenticated API requests) to provision and operate services that are instantiated on physical computing devices hosted and operated by the computing resource service provider 124. The services are configured to manage resources (e.g., storage, processors, memory, network, etc.) associated with those services. The resources may be used for various purposes, such as to operate as servers supporting a website, to operate business applications or, generally, to serve as computing power for the customer. Other applications of the services can support database applications, electronic commerce applications, business applications, and/or other such applications.

In one embodiment, the data propagator service 108 is a collection of computing resources that operate collectively to process and resolve data update events. The computing resources configured to process and resolve data update events can include at least one of: computer systems (the computer systems including processors and memory), networks, storage devices, executable code, services, processes, modules, or applications. In one embodiment, the computing resources configured to process and resolve data update events include virtual systems that are implemented on shared hardware hosted by a computing resource service provider such as the computing resource service provider 124. In one embodiment, the data propagator service 108 is implemented as a single system. In one embodiment, the data propagator service 108 is implemented as a distributed system, with a plurality of instances operating collectively to process and resolve data update events. In one embodiment, the data propagator service 108 operates using computing resources (e.g., databases and/or virtual machine instances) that enable the data propagator service 108 to store, locate, and retrieve stored data quickly, to allow operations to be performed in response to data update events, to allow data to be retrieved from storage, or to allow operations to be performed in response to requests to retrieve stored data (e.g., restore requests).

In one embodiment, the data propagator service 108 maintains data and/or metadata associated with the data in a manner such that, when a request to process and/or resolve data update events for a data item is received, the data can be located, processed, and provided (or a streaming data object can be initiated) in a response to the request. As noted herein, data processed by the data propagator service 108 can be organized into data objects which are stored as described herein. The data objects may have arbitrary sizes or may, in one embodiment, have constraints on size or durability. Thus, the data propagator service 108 is configured to manage numerous data objects of varying sizes. In one embodiment, the data propagator service 108 stores the data objects to be stored in storage resources controlled by the data propagator service 108. In one embodiment, the data propagator service 108 stores the data objects to be stored using resources controlled by some other service such as a data storage service (such as the data storage service described below). In one embodiment, the data propagator service 108 stores the data objects to be stored using a combination of storage locations. In one embodiment, the data propagator service 108 operates as a key value store that associates the data objects with identifiers of the data objects that are used to retrieve or perform other operations in connection with the data objects managed by the data propagator service 108. In one embodiment, the data propagator service 108 generates metadata associated with the data objects and causes such metadata to be stored with the data objects or in some other determined location.

As mentioned above, the data repository 104 and/or the data repository 116 are, in one embodiment, data repositories managed by a data storage service 126 of the computing resource service provider 124. As with the data propagator service 108, the data storage service 126 is, in one embodiment, a collection of computing resources that operate collectively to store data. The computing resources configured to store data can include at least one of: computer systems (the computer systems including processors and memory), networks, storage devices, executable code, services, processes, modules, or applications. The computing resources configured to store data can also include virtual systems that are implemented on shared hardware hosted by a computing resource service provider such as the computing resource service provider 124. In one embodiment, the data storage service 126 is implemented as a single system. In one embodiment, the data storage service 126 is implemented as a distributed system, with a plurality of instances operating collectively to process and resolve data update events. In one embodiment, the data storage service 126 operates using computing resources (e.g., databases and/or virtual machine instances) that enable the data storage service 126 to store, locate, and retrieve stored data quickly, to allow operations to be performed in response to data update events, to allow data to be retrieved from storage, or to allow operations to be performed in response to requests to retrieve stored data (e.g., restore requests).

In one embodiment, the data storage service 126 maintains data and/or metadata associated with the data in a manner such that, when a request to locate a data item is received, the data can be located, processed, and provided (or a streaming data object can be initiated) in a response to the request. As noted, data stored by the data storage service 126 is, in one embodiment, organized into data objects which are stored as described herein. In one embodiment, the data objects have arbitrary sizes. In one embodiment, the data objects have constraints on size or durability. Thus, in one embodiment, the data storage service 126 manages numerous data objects of varying sizes. In one embodiment, the data storage service 126 stores the data objects to be stored in storage resources controlled by the data storage service 126. In one embodiment, the data storage service 126 operates as a key value store that associates the data objects with identifiers of the data objects that are used to store, retrieve, or perform other operations in connection with the data objects managed by the data storage service 126. The data storage service 126 also, in one embodiment, generates metadata associated with the data objects and stores such metadata with the data objects or in some other determined location. The data storage service 126 stores data in, for example, databases, on hard disk drives, in volatile memory, in non-volatile memory, in block storage, or using some other such storage mechanism.

It should be noted that, while the example environment 100 illustrated in FIG. 1 shows the one or more data updates 102 and the one or more data updates 114 being received by the data repositories (e.g., the data repository 104 and/or the data repository 116) from outside of the environment of the computing resource service provider 124, in one embodiment at least a subset of the one or more data updates 102 and/or at least a subset of the one or more data updates 114 are generated by services of, and/or are operating within the environment of, the computing resource service provider 124. In one embodiment, a virtual machine instance is instantiated within the environment of the computing resource service provider 124 and, processes or applications operating thereon generate at least a subset of the one or more data updates 102 and/or at least a subset of the one or more data updates 114.

It should also be noted that, while the example environment 100 illustrated in FIG. 1 shows the data repository 104 and the data repository 116 hosted by the environment of the computing resource service provider 124, in one embodiment one or both of the data repository 104 and the data repository 116 are hosted outside of the environment of the computing resource service provider 124. In one embodiment, the data repository 104 and/or the data repository 116 can be hosted in an environment hosted by a customer of the computing resource service provider 124. In one embodiment, the data repository 104 and/or the data repository 116 can be hosted in an environment hosted by a third party to the computing resource service provider 124 (e.g., an environment hosted by neither the customer of the computing resource service provider 124 nor the computing resource service provider 124). It should also be noted that the data repository 104 and the data repository 116 are, in one embodiment, hosted in separate zones as described below.

In the example environment 100 illustrated in FIG. 1, the data updates 102 are received at a data repository 104 and the data updates 114 are received at a data repository 116. In one embodiment, only one of the data repository 104 and the data repository 116 receives data updates. In one embodiment, the data repository 104 receives the one or more data updates 102 and the data propagator service can send the resolved updates 122 (e.g., the resolved aggregate of multiple updates) to the data repository 116, thus duplicating (also referred to herein as "mirroring") the state of the data repository 104 to the data repository 116. Such mirroring of a first data repository to a second data repository is performed when, in an embodiment, a service is using the data repository 104 but is in the process of migrating resources to use the data repository 116. Such mirroring of a first data repository to a second data repository during migration may prevent any downtime in the migration due to the fact that the second data repository is a duplicate of the first data repository after the resolved updates are sent to the second data repository. It should be noted that, during such a migration, the second data repository (e.g., the data repository 116) can, in one embodiment, receive data updates as well. In such an embodiment, the data propagator service 108 will resolve 110 the data updates from the multiple sources (e.g., the data repository 104 and the data repository 116) as described herein.

In the example environment 100 illustrated in FIG. 1, the data updates 102 are received at a data repository 104 and the data updates 114 are received at a data repository 116. In one embodiment, the data repository 104 and the data repository 116 are two of two or more data repositories. In an embodiment, a data repository can be hosted in each of a plurality of zones (described below) where the plurality includes two, three, four, or more zones, with a data repository in each. In such an embodiment, additional data rules may be provided to the data configuration 112 so that the data propagator service 108 can resolve 110 the updates from the plurality of sources. In one embodiment, the data propagator service 108 uses quorum rules (e.g., a majority of available data repositories) to determine the value of a data item. Thus, if there are, for example, ten data repositories total, with seven available (e.g., because three cannot be queried), and four of the available data repositories have a value of four for a data item, two of the available data repositories have a value of three, and one of the available data repositories has a value of one, the quorum value (i.e., for the four available data repositories) is four.

Figure 2:
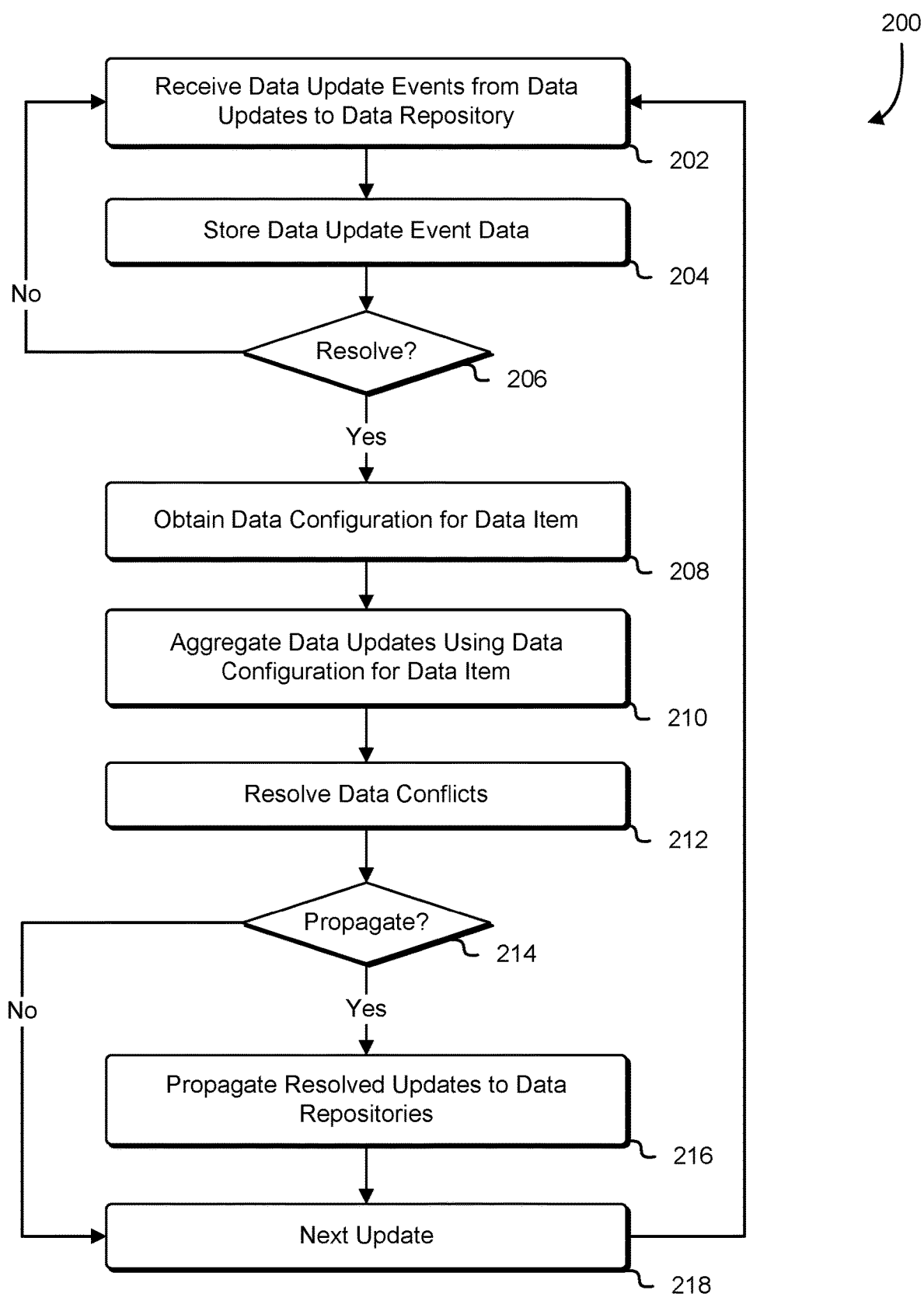
FIG. 2 illustrates an example process for maintaining the state of data in one or more databases using a data propagator service.

FIG. 2 illustrates an example process 200 for maintaining the state of data in one or more databases using a data propagator service as described in connection with FIG. 1 and in accordance with an embodiment. A data propagator service such as the data propagator service 108 described in connection with FIG. 1 performs the example process 200 illustrated in FIG. 2. The data propagator service first receives 202 data update events based at least in part on data updates to a data repository. In one embodiment, the data update events are event messages generated in response to the data updates to the data repository that include information associated with the data update including, but not limited to, the previous value, the new value, the time of the update, the data item updated, and metadata associated with the update. The data propagator service next stores 204 the data update event data, and the data propagator service next determines 206 whether to resolve the data update event with one or more other previously stored data update event data items.

If the data propagator service determines 206 to not resolve the data update event with one or more other previously stored data update event data items, the data propagator service waits until it receives 202 more data update events. If the data propagator service determines 206 to resolve the data update event with one or more other previously stored data update event data items, the data propagator service next obtains 208 data configuration for the data item that is associated with the data update event. In one embodiment, the data propagator service also obtains one or more other previously stored data update event data items when the one or more previously stored data update event data items are associated with the data item that was updated. In one embodiment, if the data update event is to a counter, as described above, the data propagator service obtains one or more previously stored data update event data items that are associated with that counter (i.e., one or more previous data update events to the counter).

The data propagator service next aggregates 210 the data updates using the data configuration for the data item by applying the rules of the data configuration as described herein. In one embodiment, the data propagator service next resolves 212 data conflicts, also according to the rules of the data configuration. In one embodiment, a first data update event indicates that a value of a variable was set to ten at a first time T1 and a second data update event indicates that the value of the variable was set to twelve at a second time T2, which is after the first time T1. In one embodiment where the rules of the data configuration specify that the update at the later time (e.g., the update at time T2) is to be preferred to the update at the earlier time (e.g., the update at time T1), the data propagator service resolves the conflict in favor of the update at the later time and set the value of the variable to twelve.

The data propagator service next determines 214 whether to propagate the resolved updates as resolved values. In one embodiment, the data propagator service propagates each resolved update. In another embodiment, the data propagator service stores one or more resolved updates and propagates them in a batch. In such an embodiment, the data propagator service resolves additional update events received against the stored resolved updates before propagating them in a batch. If the data propagator service determines 214 not to propagate the resolved updates, the data propagator service waits 218 for the next update and receives 202 more data update events. If the data propagator service determines 214 to propagate the resolved updates, the data propagator service propagates 216 the resolved updates to the one or more data repositories, waits 218 for the next update, and receives 202 more data update events.

Figure 3:
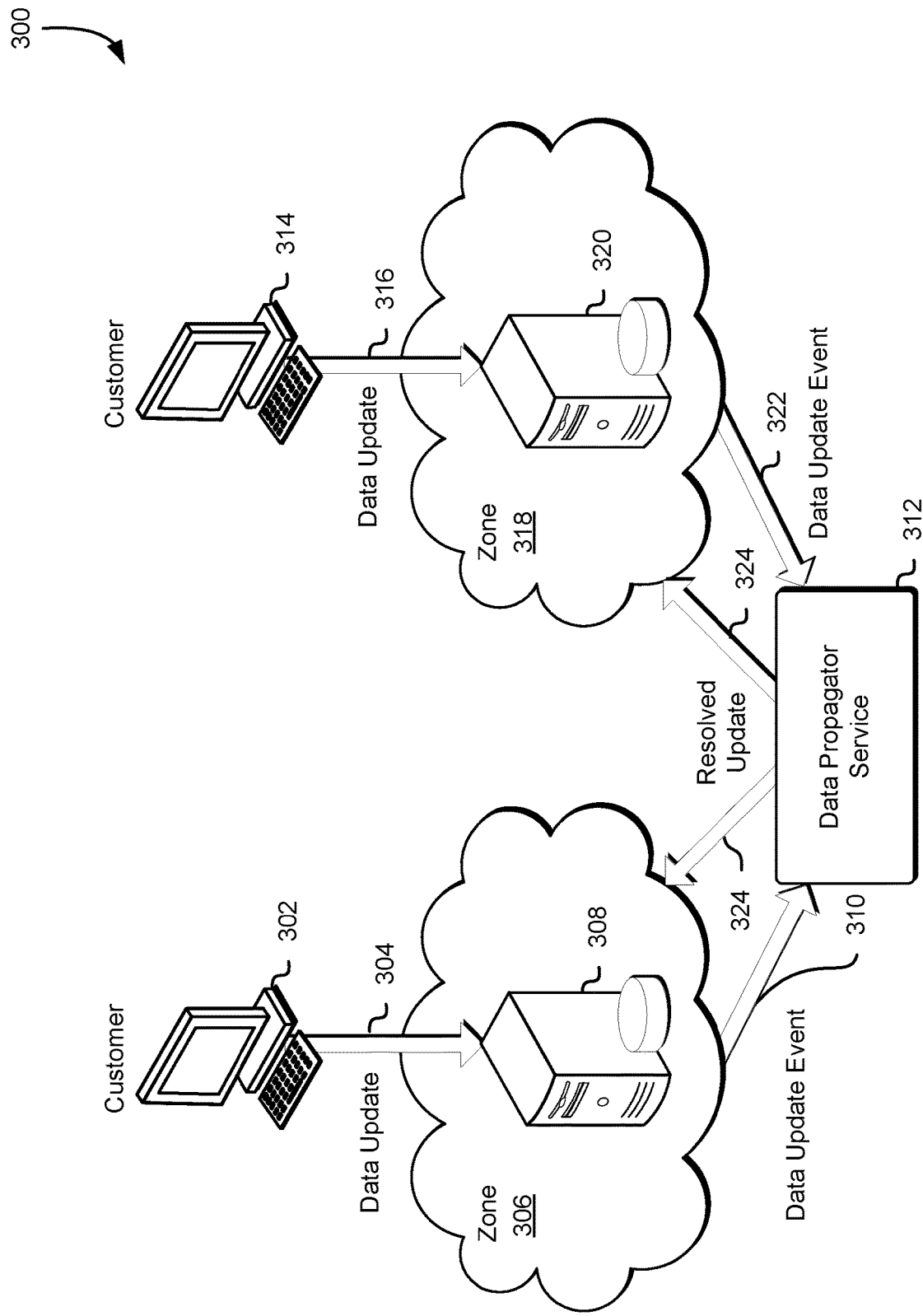
FIG. 3 illustrates an example environment where the state of data in one or more databases is maintained using a data propagator service.

FIG. 3 illustrates an example environment 300 where the state of data in one or more databases is maintained using a data propagator service as described in connection with FIG. 1 and in accordance with an embodiment. In the example illustrated in FIG. 3, a data propagator service 312 receives data update events (e.g., the data update event 310 or the data update event 322) from a plurality of repositories which are used to determine and/or maintain the state of data stored within the plurality of repositories in accordance with an embodiment. The data propagator service 312 maintains data consistency in environments containing multiple repositories (e.g., the data repository 308 and/or the data repository 320). A data repository (which may also be referred to herein as a "database" or a "data store") is a data storage location such as those described herein.

In the example illustrated in FIG. 3 the data repository 308 is located in the zone 306 and the data repository 320 is located in the zone 318. In one embodiment, the zone 306 and the zone 318 are each a particular network or zone, such as, for example, an availability zone, a fault zone, a physical location, a virtual private network, a physical network, a datacenter, a physical grouping, or a logical grouping. In one embodiment, a customer such as the customer 302 and/or the customer 314 accesses specific repositories and provides data updates (e.g., the data update 304 and/or the data update 316) to the repositories. As described above, a customer may be a customer of a computing resource service provider, a customer of the data propagator service 312, and/or a customer of some other service that utilize the data propagator service 312 to obtain eventual consistency of the data maintained in the data repository 308 and/or the data repository 320.

In one embodiment, the data repository 308 and/or the data repository 320 include physical or virtual computing devices that host one or more data stores. In one embodiment, the data repository 308 and/or the data repository 320 are logical groupings of data stored on physical or virtual computing devices. Examples of logical groupings (e.g., zone 306 and/or zone 318) include servers and/or other computing devices in different fault isolation groups. As used herein, fault isolation groups are logical divisions of resources such that failure of one fault zone does not affect servers in the other zones. Fault isolation groups are grouped by, for example, geographic region, data center locations, hard drive clusters, backup systems, and/or data sources. Examples of logical groupings (e.g., zone 306 and zone 318) also include servers and/or other devices grouped together based on performance characteristics (e.g., data throughput, input/output operations per second, network bandwidth, etc.). In one embodiment, the data repository 308 in the zone 306 and/or the data repository 320 in the zone 318 are assigned a particular network address associated with a particular network to provide isolation. In one embodiment, multiple repositories are members of the same network (i.e., they have access to the same network resources). In one embodiment, the data repository 308 and/or the data repository 320 are components of service that includes various processors, memory, input/output (I/O), and storage configurations.

The data repository 308 and/or the data repository 320 may include queryable data storage systems, non-queryable data storage systems, or a combination of queryable and non-queryable data storage systems. A data storage system and/or data storage device is queryable if the data storage system and/or data storage device enables requestors to submit data queries and receive response to the submitted data queries. In one embodiment, the data repository 308 and/or the data repository 320 includes a database, such as an Structured Query Language ("SQL") database, which enables the customers (e.g., the customer 302 and/or the customer 314), the data propagator service 312, or other services of the computing resource service provider to query the data repository 308 and/or the data repository 320 for information contained in or associated with the data and stored by repositories. In one embodiment, the data repository 308 and/or the data repository 320 are non-queryable data storage systems where data is stored as data objects that are obtainable by a data identifier, such as a table key, but that are not configured to enable queries on information contained in the repositories.

As a result of receiving data updates such as the data update 304 and/or the data update 316, the data propagator service 312 receives data update events as described herein. In one embodiment, the data update 304 causes the generation of the data update event 310 and/or the data update 316 causes the generations of the data update event 322. As a result of a trigger (e.g., an internal trigger or the external trigger associated with the data update events), the data propagator service 312 then resolve the updates as described herein and sends the resolved updates 324 to the data repository 308 in zone 306 and the data repository 320 in the zone 318, resulting in consistent data between the repositories.

Figure 4:
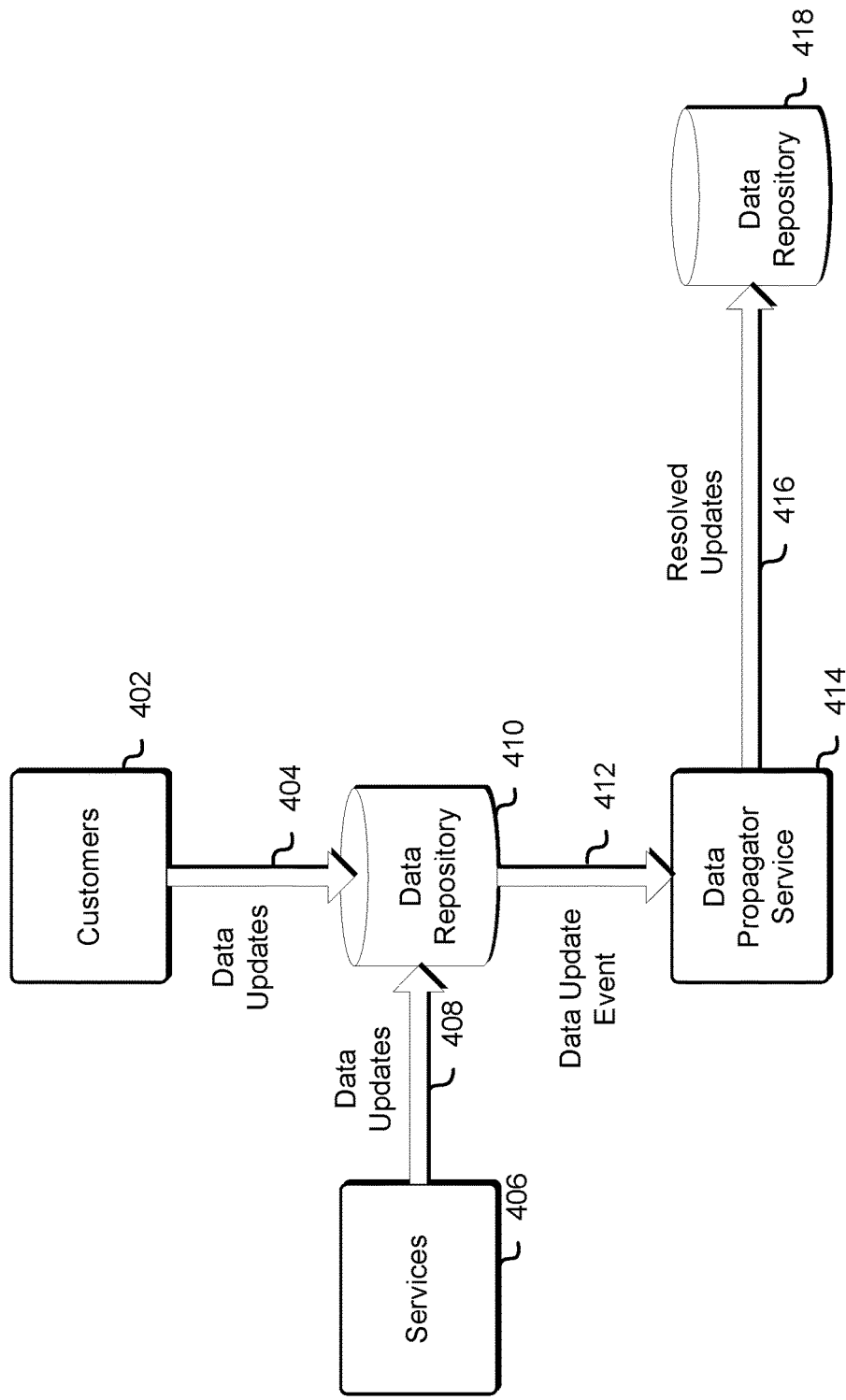
FIG. 4 illustrates an example environment where the state of data from multiple data update events is maintained using a data propagator service.

FIG. 4 illustrates an example environment 400 where the state of data from multiple data update events is maintained using a data propagator service as described in connection with FIG. 1 and in accordance with an embodiment. In the example environment 400 illustrated in FIG. 4, data updates 404 to a data repository 410 are received from one or more customers 402 as described above. It should be noted that while the data updates 404 to a data repository 410 are received from the one or more customers 402, additional data updates 408 to the data repository 410 may also be received from one or more services 406.

The one or more data updates 404 from the one or more customers 402 and the one or more data updates 408 from the one or more services 406 cause data update events 412 to be generated and sent to the data propagator service 414 as described above. In an example, a first customer sets a counter value to three (from two) and sets the height value of a particular data item to 5'9" at a time T1. In the example, a second customer sets the counter value to three (from two) and sets the weight value of a particular data item to 180 pounds at the time T2, which is later than the time T1. In the example, a first service sets the counter value to three (from two), sets the height value of the particular data item to 5'10", and sets the weight value of the particular data item to 190 pounds at a time T3, which is later than the time T1 but earlier than the time T2. In the example, each of these updates (e.g., two updates for the first customer, two updates for the second customer, and three updates for the service) cause data update events 412 to be generated and sent to the data propagator service 414.

The data propagator service 414 then resolves the data update events 412 as described herein and sends the resolved updates 416 to a data repository 418. In one embodiment, the data repository 418 is the same as the data repository 410. In one embodiment, the data repository 418 is a duplicate of the data repository 410. In one embodiment, the data repository 418 is a data repository in a different zone as the data repository 410. Continuing the example above, the data propagator service 414 resolves the counter value to five (e.g., one update from two to three, one update from three to four, and one update from four to five), resolves the height value to 5'10" (because the update to 5'10" from the service came after the update to 5'9" from the first customer, and resolves the weight value to 180 pounds (because the update to 190 pounds from the service came before the update to 180 pounds from the second customer).

Figure 5:
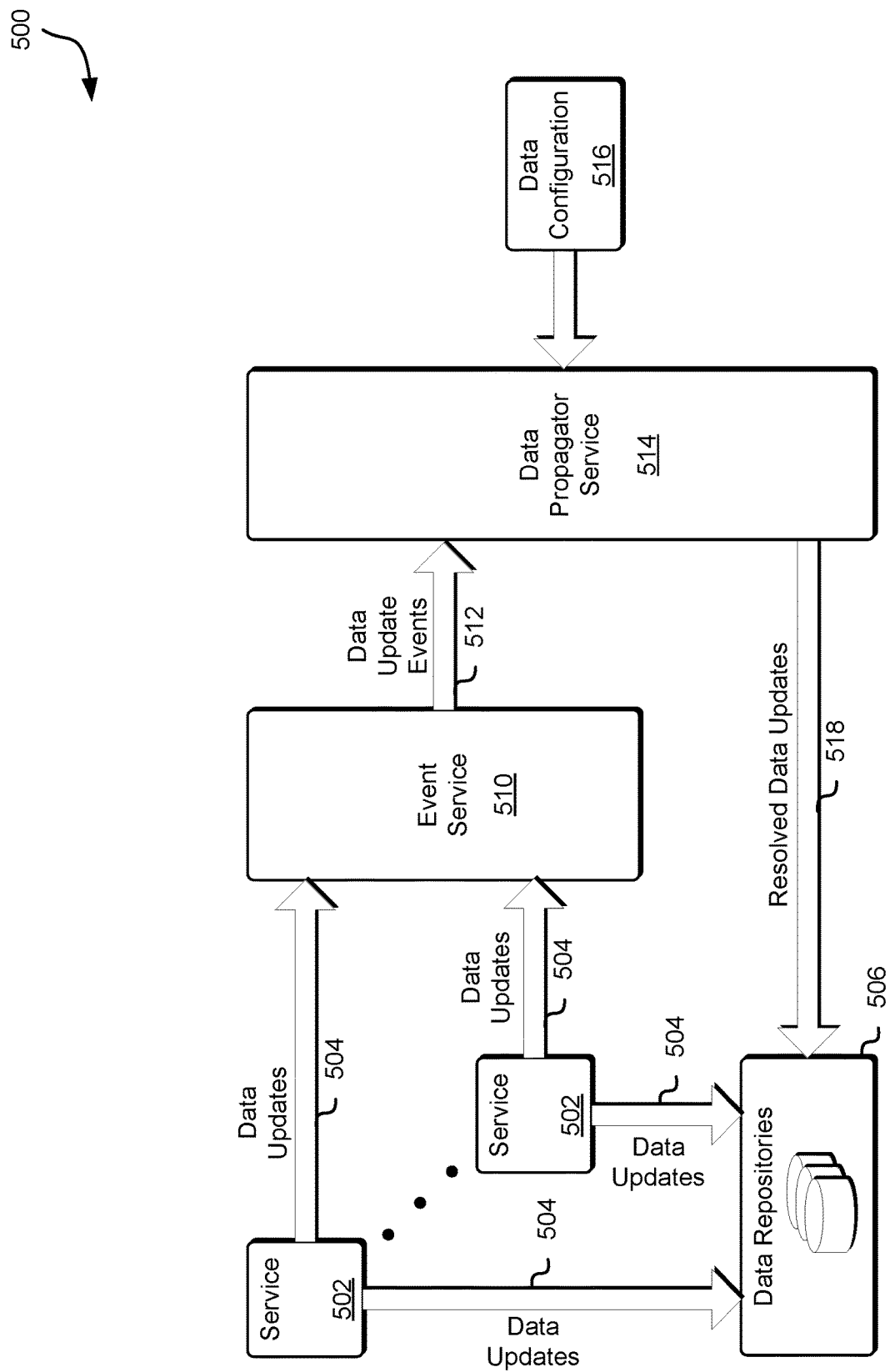
FIG. 5 illustrates an example environment where the state of data is determined based at least in part on data rules and update events using a data propagator service.

FIG. 5 illustrates an example environment 500 where the state of data is determined based at least in part on data rules and update events using a data propagator service as described in connection with FIG. 1 and in accordance with an embodiment. In the example environment 500 illustrated in FIG. 5, data updates 504 are generated by services 502 and sent to one or more data repositories 506. The data updates 504 are also received by an event queue of an event service 510. In one embodiment, the event service 510 monitors network traffic sent to a data storage service to obtain the data updates 504. In one embodiment, the event service 510 monitors network traffic sent to a database service to obtain the data updates 504. In one embodiment, the event service 510 receives duplicates of the data updates 504 as data streams. In another embodiment, the services 502 are configured with agents that send the data updates 504 to the event service 510.

The event service 510 receives the data updates and generates one or more data update events 512, which are sent to the data propagator service 514 as described above. The data propagator service 514 then resolves the updates using the data configuration 516 and sends the resolved data updates 518 to one or more of the data repositories 506. In one embodiment, the event service 510 is a collection of computing resources that operate collectively to receive data updates and to generate data update events that correspond to the data updates. The computing resources configured to receive data updates and to generate data update events that correspond to the data updates can include at least one of: computer systems (the computer systems including processors and memory), networks, storage devices, executable code, services, processes, modules, or applications. In one embodiment, the computing resources configured to receive data updates and to generate data update events that correspond to the data updates include virtual systems that are implemented on shared hardware hosted by a computing resource service provider such as the computing resource service provider 124 described in connection with FIG. 1. In one embodiment, the event service 510 is implemented as a single system. In one embodiment, the event service 510 is implemented as a distributed system, with a plurality of instances operating collectively to receive data updates and to generate data update events that correspond to the data updates. In one embodiment, the event service 510 operates using computing resources (e.g., databases and/or virtual machine instances) that enable the event service 510 to receive data updates and to generate data update events that correspond to the data updates. In one embodiment, the event service 510 is a general purpose event service such as, for example, a message queue service. In one embodiment, the event service 510 is a dedicated event service configured to receive data updates and to generate data update events that correspond to the data updates.

Figure 6:
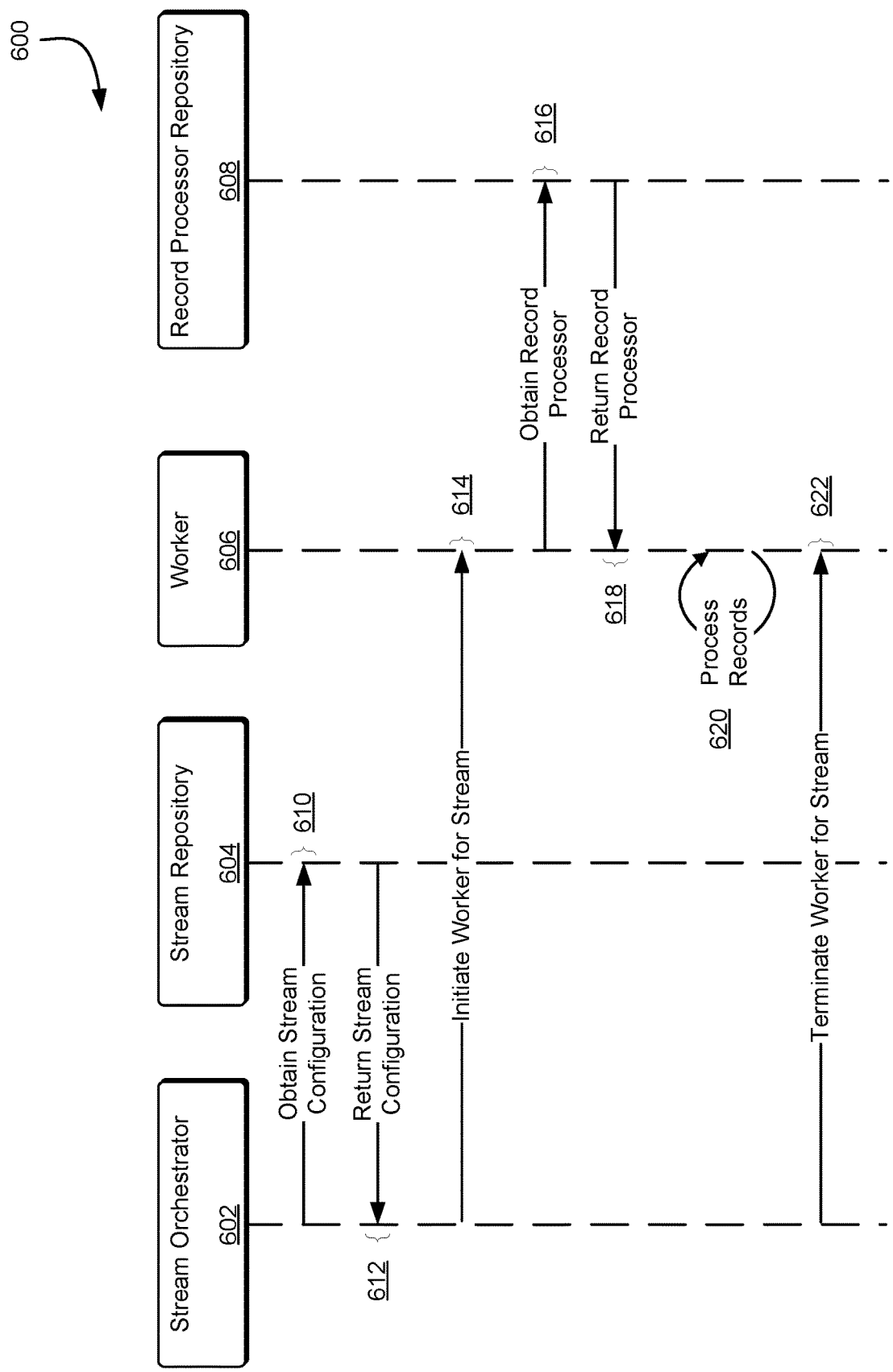
FIG. 6 illustrates an example data flow diagram for establishing a worker to maintain a stream of update events to a database using a data propagator service.

FIG. 6 illustrates an example data flow diagram 600 for establishing a worker to maintain a stream of update events to a database using a data propagator service as described in connection with FIG. 1 and in accordance with an embodiment. In the example data flow diagram 600 illustrated in FIG. 6, a stream orchestrator 602 first sends a request to obtain a stream configuration 610 from a stream repository 604. The stream repository 604 returns the stream configuration 612 to the stream orchestrator 602. In the example illustrated in FIG. 6, the stream orchestrator 602 receives data update events that are generated as described herein and orchestrates (i.e., manages) the processing of the data update events. In one embodiment, the data update events are database streams such as those described herein. Based on the data update events, the stream orchestrator 602 obtains a stream configuration 610 corresponding to the data update event from the stream repository and uses that obtained stream configuration 612 to initiate the worker for the stream. In one embodiment, the stream orchestrator 602 determines whether to process the data update event based at least in part on a data configuration such as the data configuration 112 described in connection with FIG. 1.

If the stream configuration is returned to the stream orchestrator 602, the stream orchestrator 602 next sends a request to initiate a worker for the stream 614. In one embodiment, there is one worker 606 for the stream corresponding to each data update event. The worker 606 for the stream then sends a request to obtain a record processor 616 from a record processor repository 608. In one embodiment, the worker 606 for the stream obtains multiple record processors when there are multiple records in the stream. In one embodiment, a single record processor is used to process the records for the stream. The record processor repository 608 returns the record processor 618 to the worker 606. The worker 606 then uses the record processor to process records 620 as they are received. In one embodiment, the worker 606 determines whether to process each record based at least in part on the record processor. In one embodiment, a record that was previously processed by another worker may not be processed by the worker 606. When the stream orchestrator 602 determines that no more records should be processed, the stream orchestrator 602 terminates the worker for the stream 622.

Figure 7:
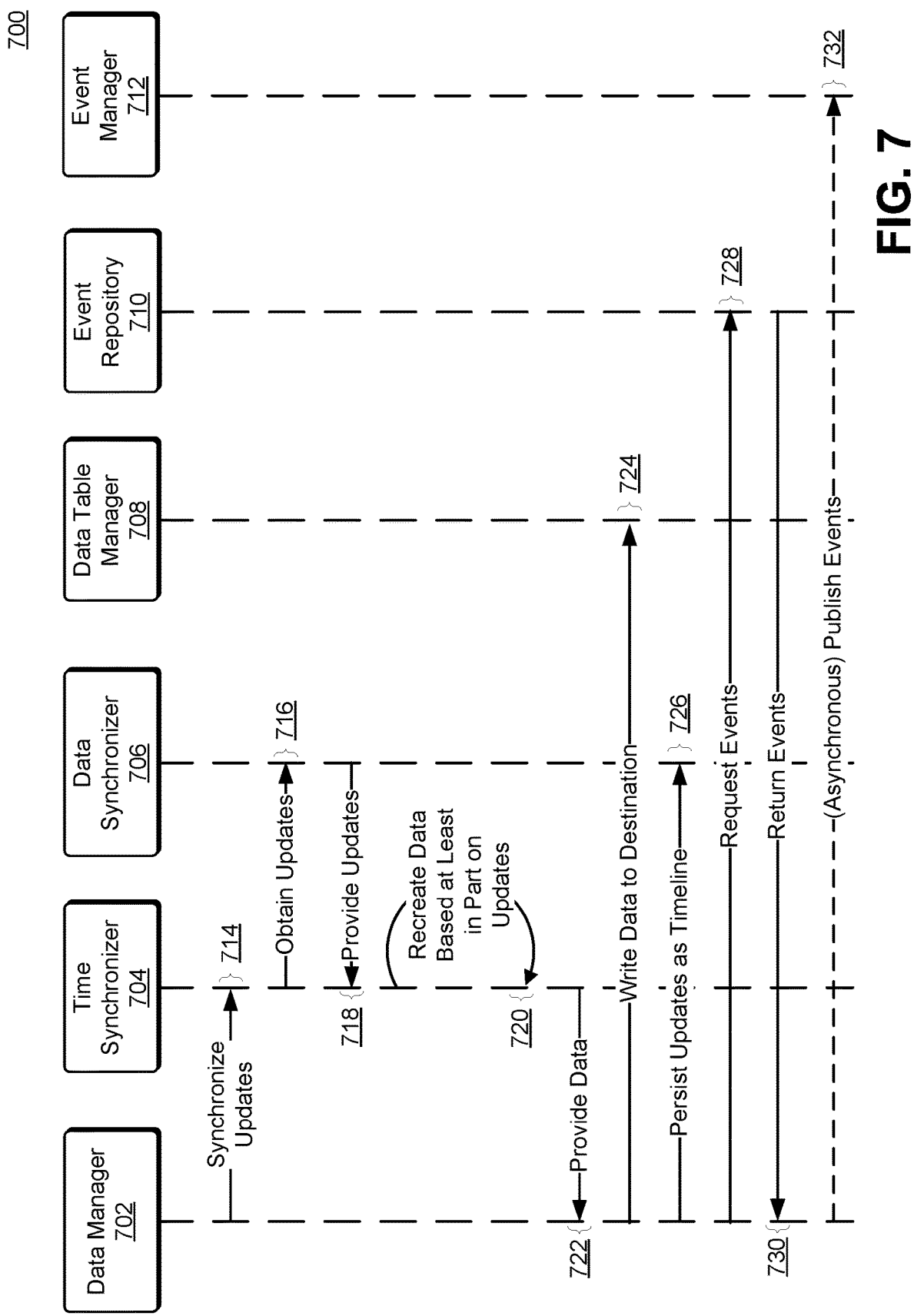
FIG. 7 illustrates an example data flow diagram for synchronizing the state of data maintained in a database using a data propagator service.

FIG. 7 illustrates an example data flow diagram 700 for synchronizing the state of data maintained in a database using a data propagator service as described in connection with FIG. 1 and in accordance with an embodiment. In the example data flow diagram 700 illustrated in FIG. 7, a data manager 702 sends a request to synchronize updates 714 to a time synchronizer 704. The time synchronizer 704 then sends a request to obtain the updates 716 to a data synchronizer 706. The data synchronizer 706 provides the updates 718 to the time synchronizer 704. In one embodiment, the updates 718 are updates that were received by the data synchronizer 706 prior to providing the updates 718 to the to the time synchronizer 704. In one embodiment, a series of updates to a data value such as the series of updates to a counter value as described above are applied to the counter variable by the data synchronizer 706. If one or more of the series of data updates are not applied by the data synchronizer 706 because, for example, they are not resolved by the data synchronizer 706, the unapplied data updates are provided to the time synchronizer as the updates 718.

The time synchronizer 704 then orders the updates by time and applies the updates to recreate the data 720 based at least in part on the updates received from the data synchronizer 706. As illustrated in the example messaging diagram 700 illustrated in FIG. 7, the process whereby the time synchronizer 704 recreates the data 720 based at least in part on the updates received from the data synchronizer 706 is an iterative process, with multiple updates aggregated sequentially to recreate the data.

After the time synchronizer 704 recreates the data 720 based at least in part on the updates received from the data synchronizer 706, the time synchronizer 704 provides the data 722 to the data manager 702. The data manager 702 then writes the data to the destination 724 (e.g., the destination repository) using a data table manager 708.

The data manager 702 next persists updates as a timeline 726 in the data synchronizer 706 and requests the data update events 728 from the event repository 710. The returned events 730 from the event repository 710 are used by the data manager 702 to publish the events 732 (e.g., the data update events) using an event manager 712.

Figure 8:
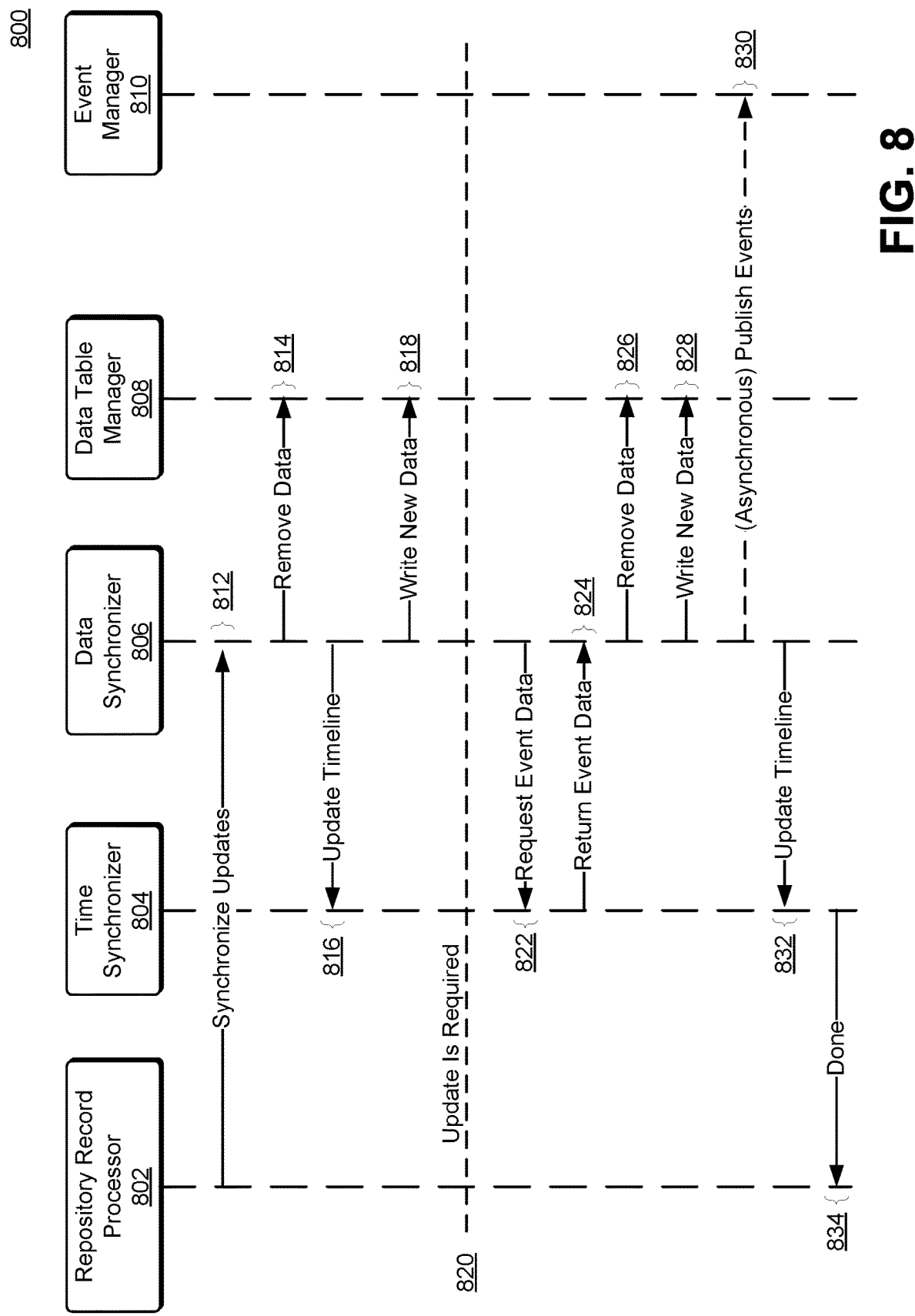
FIG. 8 illustrates an example data flow diagram for storing the state of data maintained in a database using a data propagator service.

FIG. 8 illustrates an example data flow diagram 800 for storing the state of data maintained in a database using a data propagator service as described in connection with FIG. 1 and in accordance with an embodiment. In the example data flow diagram 800 illustrated in FIG. 8, a repository record processor 802 sends a request to synchronize updates 812 to a data synchronizer 806. In response to the request to synchronize updates 812, the data synchronizer 806 sends a request to remove data 814 to a data table manager 808. Then, the data synchronizer 806 sends a request to update the timeline 816 to a time synchronizer 804. Next, the data synchronizer 806 sends a request to write new data 818 to the data table manager 808.

If the data propagator service determines that an update is required 820, the data synchronizer 806 then requests event data 822 in chronological order from the time synchronizer 804. When the time synchronizer 804 returns the event data 824 in chronological order to the data synchronizer, the data synchronizer 806 sends a request to remove data 826 to the data table manager 808, sends a request to write new data 828 to the data table manager 808, and asynchronously publishes the events 830 using the event manager 810. Finally, the data synchronizer 806 sends a request to update the timeline 832 to the time synchronizer 804, indicating that the required update is done 834.

Figure 9:
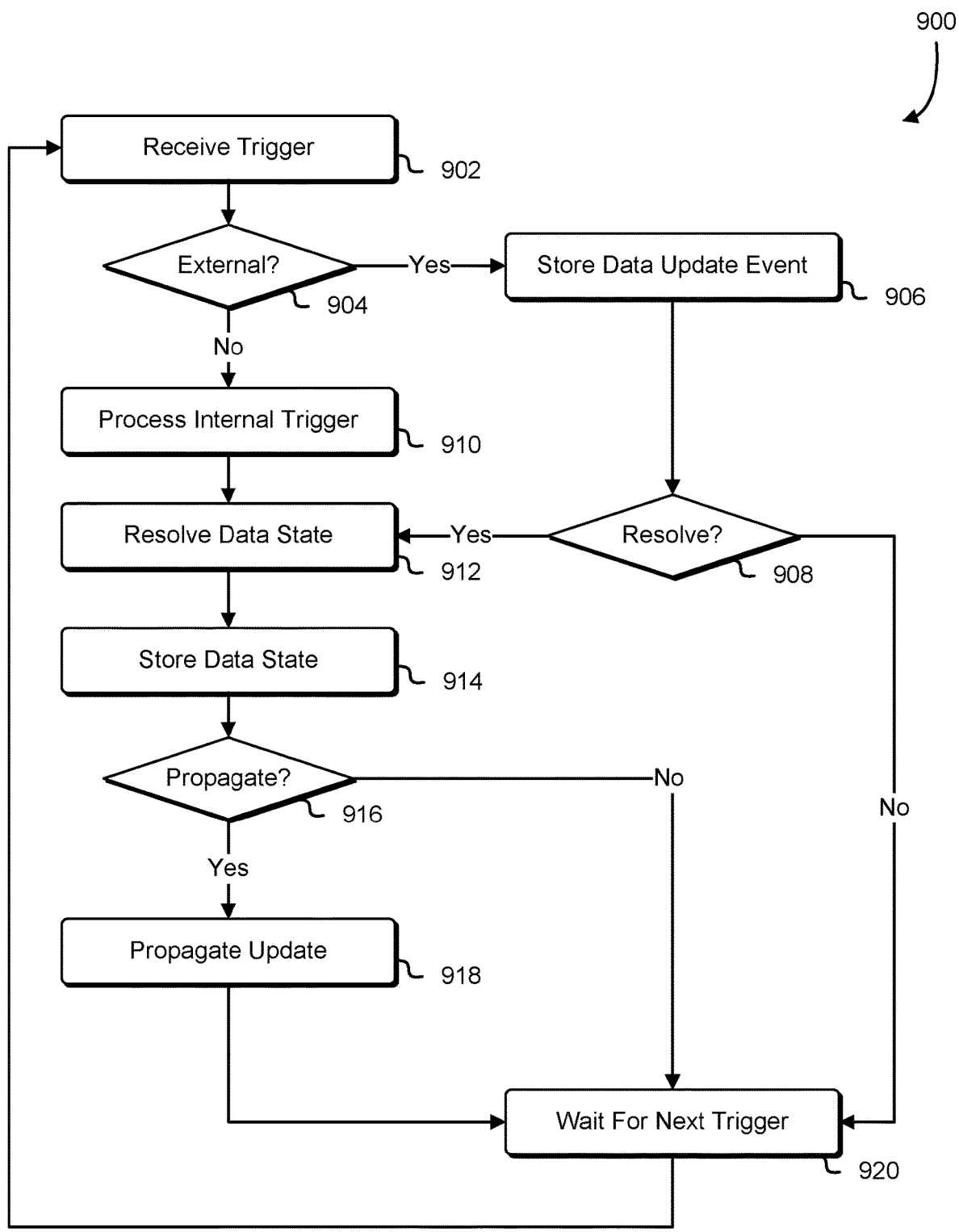
FIG. 9 illustrates an example process for determining the state of data maintained in a database and propagating the state of the data using a data propagator service.

FIG. 9 illustrates an example process 900 for determining the state of data maintained in a database and propagating the state of the data using a data propagator service as described in connection with FIG. 1 and in accordance with an embodiment. A data propagator service such as the data propagator service 108 described in connection with FIG. 1 performs the example process 900 illustrated in FIG. 9. The data propagator service first receives 902 a trigger, which may be an external trigger (e.g., a data update event) or may be an internal trigger (e.g., a request to synchronize data, as described above).

If the data propagator service determines 904 that the trigger is not an external trigger, the data propagator service processes 910 the internal trigger using, for example, the processes described in connection with the data flow diagrams illustrated in FIGS. 6-8. The data propagator service then resolves 912 the data state by aggregating any previously stored data update events, stores 914 the data state and determines 916 whether to propagate the stored data state to one or more data repositories. If the data propagator service determines 916 to propagate the stored data state to one or more data repositories, the data propagator service then propagates 918 the stored data state to the one or more data repositories. If the data propagator service determines 916 not to propagate the stored data state to one or more data repositories, the data propagator service waits 920 for the next received trigger.

If the data propagator service determines 904 that the trigger is an external trigger (e.g., a data update event), the data propagator service will store 906 the data update event and any data and/or metadata associated with the data update event. The data propagator service then determines 908 whether to resolve the data update event with any previously received data update events. If the data propagator service determines 908 to not resolve the data update event with any previously received data update events (i.e., the data propagator service determines that the resolving can occur at a later time), the data propagator service waits 920 for the next received trigger.

If the data propagator service determines 908 to resolve the data update event with any previously received data update events, the data propagator service resolves 912 the data state by aggregating any previously stored data update events (including the stored data update event of the external trigger), stores 914 the data state and determines 916 whether to propagate the stored data state to one or more data repositories. If the data propagator service determines 916 to propagate the stored data state to one or more data repositories, the data propagator service then propagates 918 the stored data state to the one or more data repositories. If the data propagator service determines 916 not to propagate the stored data state to one or more data repositories, the data propagator service waits 920 for the next received trigger.

Figure 10:
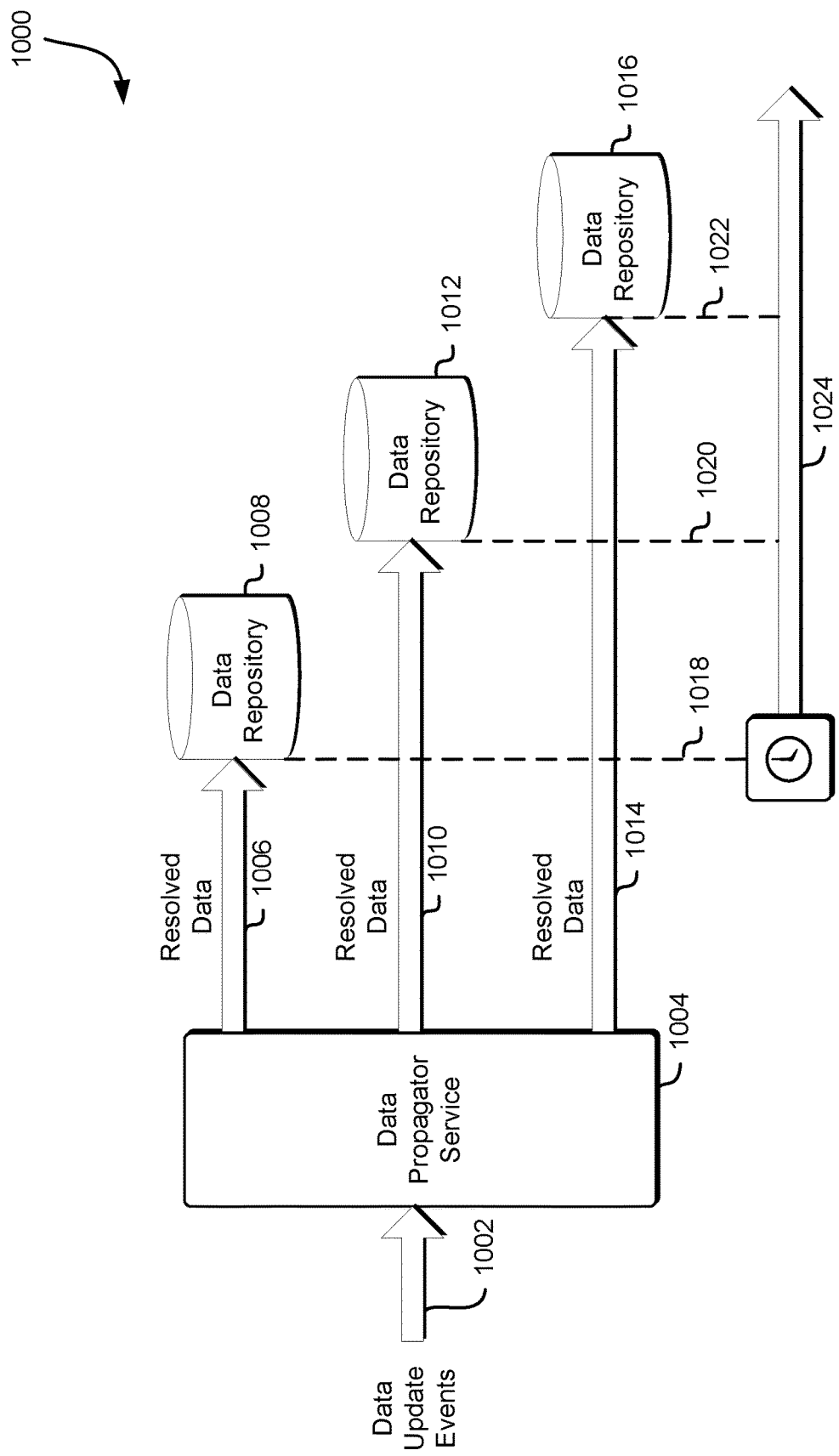
FIG. 10 illustrates an example environment where data from data update events is propagated to multiple data repositories using a data propagator service.

FIG. 10 illustrates an example environment 1000 where data from data update events is propagated to multiple data repositories using a data propagator service as described in connection with FIG. 1 and in accordance with an embodiment. In the example environment 1000 illustrated in FIG. 10, data update events 1002 are received by a data propagator service 1004 and are resolved as described herein. At a first time 1018 of a timeline 1024, the resolved data 1006 is sent to a first data repository 1008. At a second time 1020 of a timeline 1024, the resolved data 1010 is sent to a second data repository 1012. At a third time 1022 of a timeline 1024, the resolved data 1014 is sent to a third data repository 1016.

In one embodiment, the resolved data 1010 is the same as the resolved data 1006 and the resolved data 1014 is the same as the resolved data 1006. In another embodiment, the resolved data 1010 includes information usable to cause the data repository 1012 to contain the same data as the data repository 1008 and the resolved data 1014 includes information usable to cause the data repository 1016 to contain the same data as the data repository 1008. In one embodiment, the data repository 1008 contains the value three for a variable before the first time 1018 and the resolved data 1006 includes information usable to update the value for the variable to four after the first time 1018. If the second data repository 1012 contains the value four for a variable before the second time 1020 (e.g., the variable already contains the value four), the resolved data 1010 may not include an update to the value for the variable because there is no need to update the value. In such an embodiment, the resolved data 1010 is not the same as the resolved data 1006, but the resulting state of the data repository 1008 and the resulting state of data repository 1012 is the same (i.e., each contains the value four for the variable).

After the first time 1018 and before the second time 1020, the first data repository 1008 is the only data repository that must include the resolved data. The second data repository 1012 and/or the third data repository 1016 may contain the resolved data, but that is not known certain. After the second time 1020 and before the third time 1022, the first data repository 1008 and the second data repository 1012 must include the resolved data and the third data repository 1016 may contain the resolved data. In one embodiment, the resolved data in the first data repository 1008 and the resolved data in the second data repository 1012 represent a quorum (i.e., a majority of available data repositories), and the value for a variable is determined from that quorum. After the third time 1022, the first data repository 1008, the second data repository 1012, and the third data repository 1016 all include the resolved data.

Figure 11:
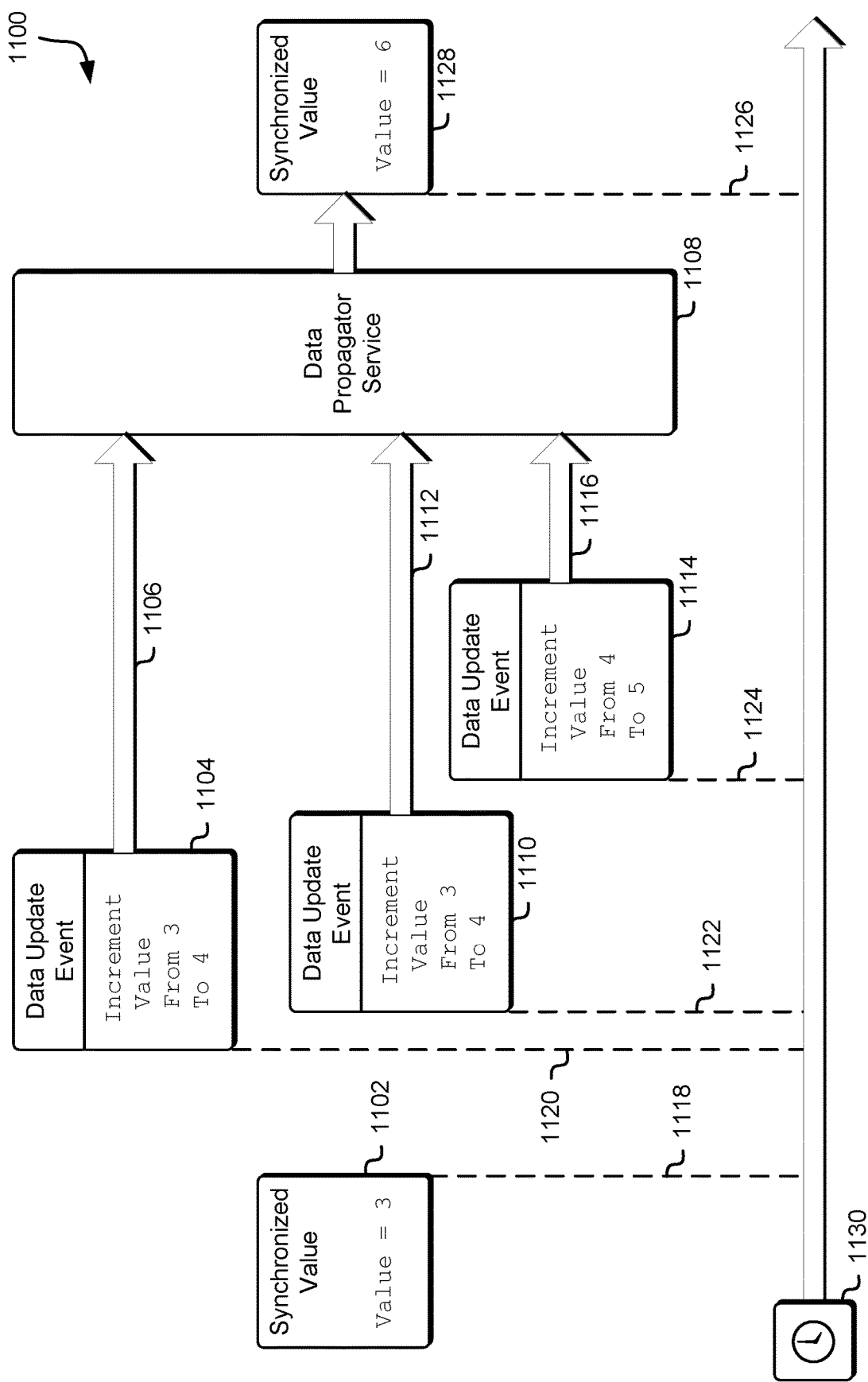
FIG. 11 illustrates an example environment where data from multiple updates is made eventually consistent using a data propagator service.

FIG. 11 illustrates an example environment 1100 where data from multiple updates is made eventually consistent using a data propagator service as described in connection with FIG. 1 and in accordance with an embodiment. In the example environment 1100 illustrated in FIG. 11, the timeline 1130 goes from left to right. Events that occur earlier in time are to the left of events that occur later in time. A synchronized value 1102 has a value of three for a variable at a first time 1118 of the timeline 1130. The synchronized value 1102 is a value that is consistent for all data repositories, as described above. At a second time 1120, a data update event 1104 increments the value from three to four and the data update event is provided 1106 to a data propagator service 1108. At a third time 1122, a data update event 1110 also increments the value from three to four and the data update event is provided 1112 to the data propagator service 1108. In one embodiment, the data update event 1110 comes from a different service and/or is received at a different data repository. At a fourth time 1124, a data update event 1114 increments the value from four to five and the data update event is provided 1116 to the data propagator service 1108. The data propagator service 1108 then resolves the data updates as described herein and, at a fifth time 1126, sends the resolved data update value of six to the one or more data repositories, thereby producing a new synchronized value 1128.

Figure 12:
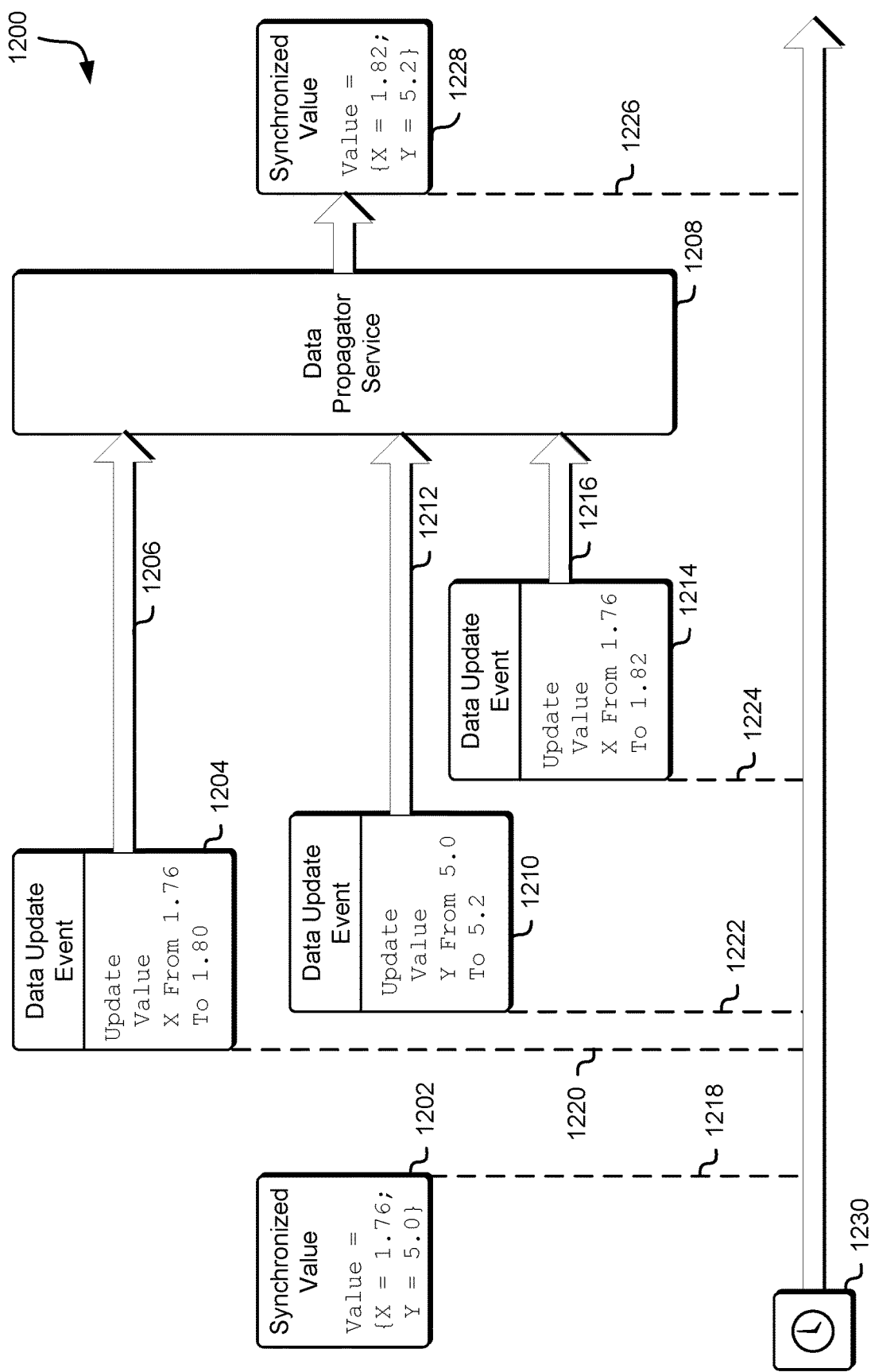
FIG. 12 illustrates an example environment where data from multiple updates is made eventually consistent using a data propagator service.

FIG. 12 illustrates an example environment 1200 where data from multiple updates is made eventually consistent using a data propagator service as described in connection with FIG. 1 and in accordance with an embodiment. In the example environment 1200 illustrated in FIG. 12, the timeline 1230 goes from left to right. Events that occur earlier in time are to the left of events that occur later in time. A synchronized value 1202 has a value of 1.76 for the "X" value of a variable and a value of 5.0 for the "Y" value of a variable at a first time 1218 of the timeline 1230. The variable in this example is a compound variable, also referred to herein as a "variable data structure." The synchronized value 1202 is a value that is consistent for all data repositories, as described above. At a second time 1220, a data update event 1204 changes the "X" value of the variable from 1.76 to 1.80 and the data update event is provided 1206 to a data propagator service 1208. At a third time 1222, a data update event 1210 changes the "Y" value of the variable from 5.0 to 5.2 and the data update event is provided 1212 to the data propagator service 1208. At a fourth time 1224, a data update event 1214 changes the "X" value of the variable from 1.76 to 1.82 and the data update event is provided 1216 to the data propagator service 1208. The data propagator service 1208 then resolves the data updates as described herein and, at a fifth time 1226, sends the resolved data update value of "X" equaling 1.82 and "Y" equaling 5.2 to the one or more data repositories, thereby producing a new synchronized value 1228.

Figure 13:
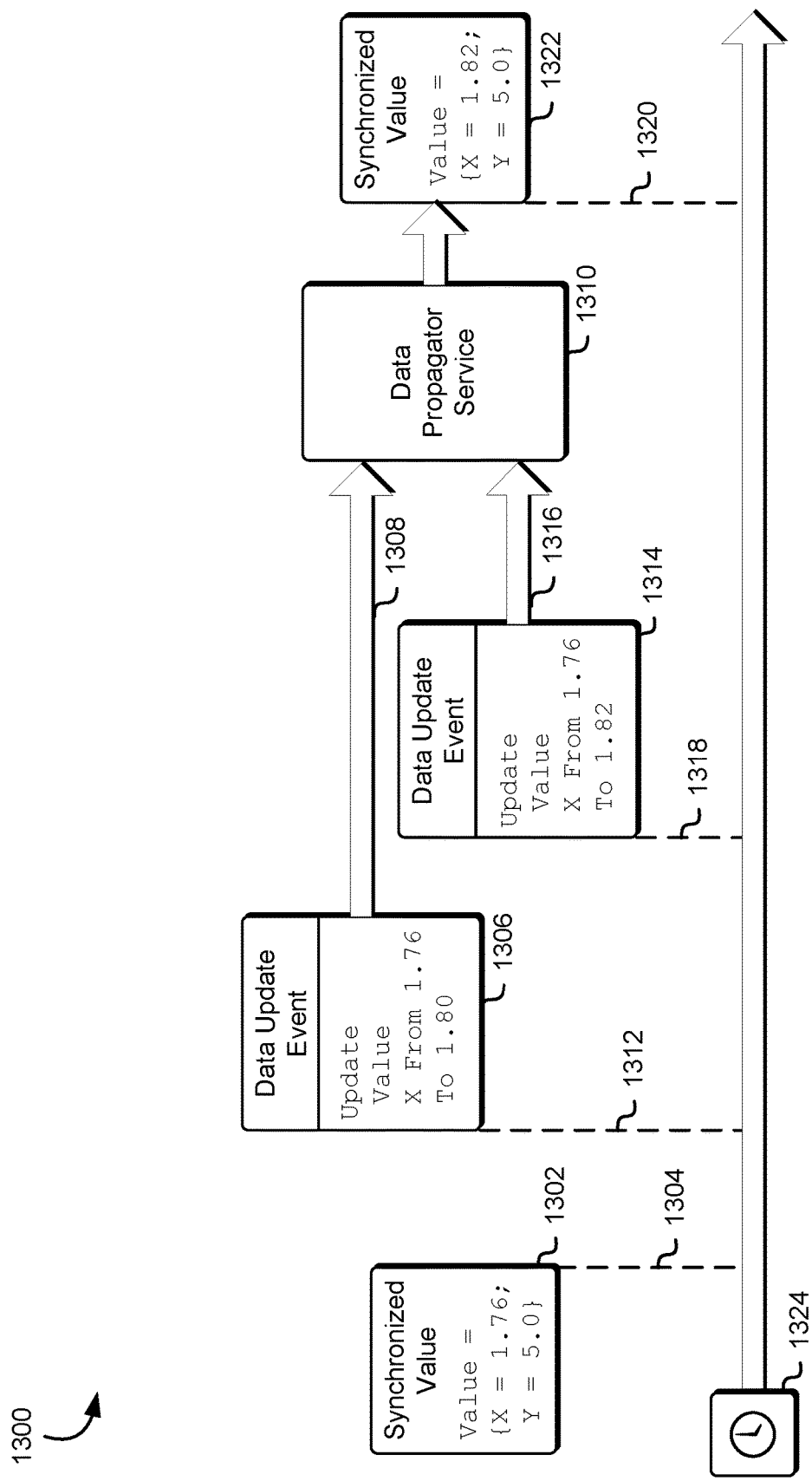
FIG. 13 illustrates an example environment for resolving inconsistencies in data from multiple updates using a data propagator service.

FIG. 13 illustrates an example environment 1300 for resolving inconsistencies in data from multiple updates using a data propagator service as described in connection with FIG. 1 and in accordance with an embodiment. In the example environment 1300 illustrated in FIG. 13, the timeline 1324 goes from left to right. Events that occur earlier in time are to the left of events that occur later in time. A synchronized value 1302 has a value of 1.76 for the "X" value of a variable and a value of 5.0 for the "Y" value of a variable at a first time 1304 of the timeline 1324. The variable in this example is a compound variable as described above. The synchronized value 1302 is a value that is consistent for all data repositories, also as described above. At a second time 1312, a data update event 1306 changes the "X" value of the variable from 1.76 to 1.80 and the data update event is provided 1308 to a data propagator service 1310. At a third time 1318, a data update event 1314 changes the "X" value of the variable from 1.76 to 1.82 and the data update event is provided 1316 to the data propagator service 1310. The data propagator service 1310 then resolves the data updates as described herein. In the example environment 1300 illustrated in FIG. 13, the data propagator service selects the later value received at the third time 1318 as being the valid value when, for example, there is not a way to otherwise resolve the inconsistent value for the variable. At a fifth time 1320, the data propagator service 1310 sends the resolved data update value of "X" equaling 1.82 to the one or more data repositories, thereby producing a new synchronized value 1322.

Figure 14:
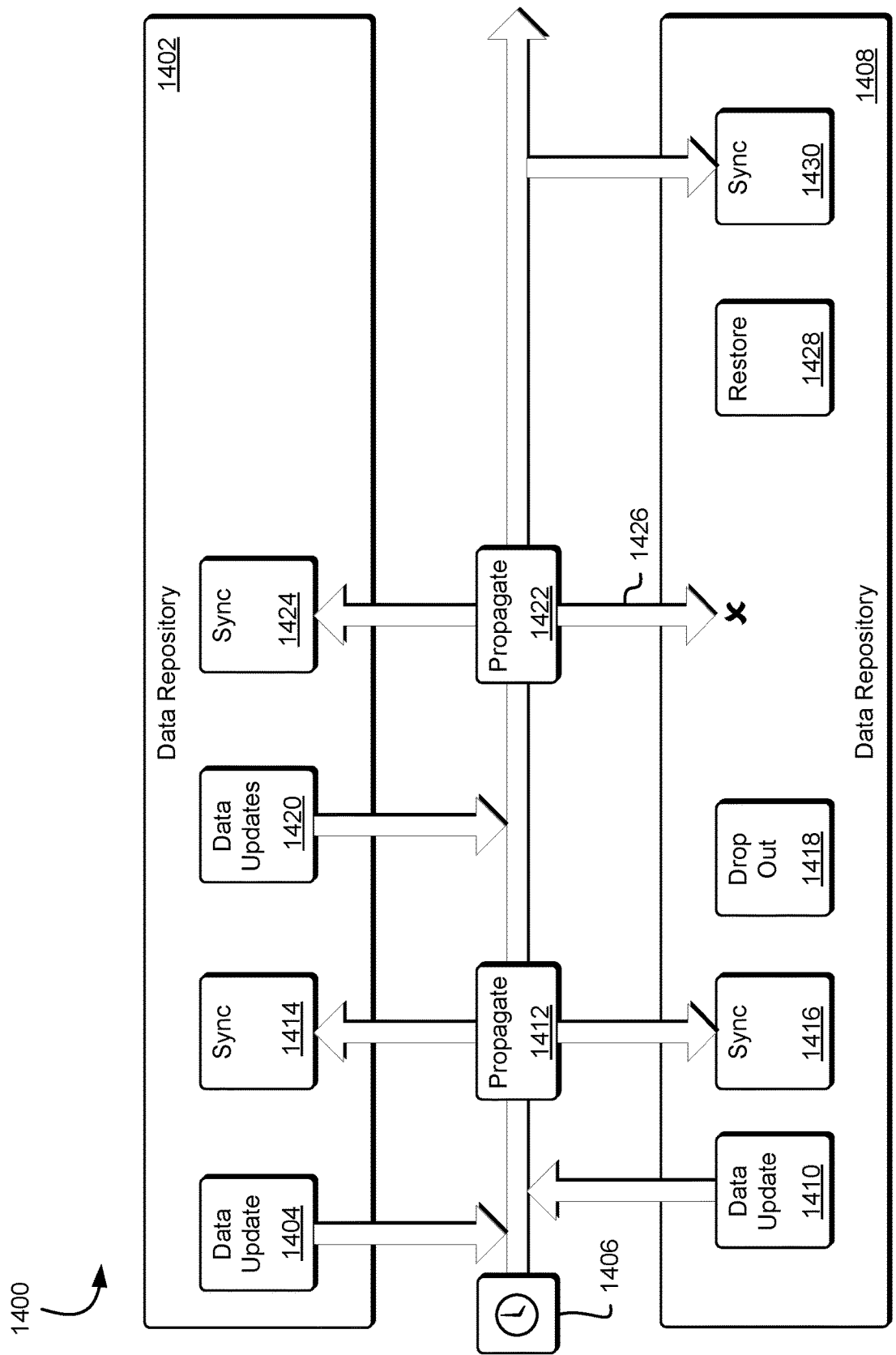
FIG. 14 illustrates an example environment for restoring data using a data propagator service.

FIG. 14 illustrates an example environment 1400 for restoring data using a data propagator service as described in connection with FIG. 1 and in accordance with an embodiment. In the example environment 1400 illustrated in FIG. 14, the timeline 1406 goes from left to right. Events that occur earlier in time are to the left of events that occur later in time. A data update 1404 is received at a first data repository 1402 and a data update 1404 is received at a second data repository 1410. Then, the data propagator service resolves data update events as described herein and propagates 1412 the resolved value so that the synchronized value 1414 (denoted as "sync" in the example environment 1400 illustrated in FIG. 14) in the first data repository 1402 and the synchronized value 1416 (also denoted as "sync" in the example environment 1400 illustrated in FIG. 14) in the second data repository 1408 have the same value.

In the example environment 1400 illustrated in FIG. 14, after the synchronized value 1414 and the synchronized value 1416 are propagated to the data repositories, the second data repository drops out 1418 so that it is not available to receive updates from the data propagator service. Subsequently, one or more data updates 1420 are received at the first data repository 1402. When the data propagator service resolves data update events as described herein and propagates 1422 the resolved values, the synchronized value 1424 (also denoted as "sync" in the example environment 1400 illustrated in FIG. 14) will be at the first data repository 1402, but because the second data repository is not available to receive updates from the data propagator service, the value will not be received 1426 at the second data repository 1408. When the second data repository 1408 is restored 1428, the second data repository 1408 can receive the propagated resolved value from the data propagator service, so that the synchronized value 1424 in the first data repository 1402 and the synchronized value 1430 (denoted as "sync" in the example environment 1400 illustrated in FIG. 14) in the second data repository 1408 have the same value.

Figure 15:
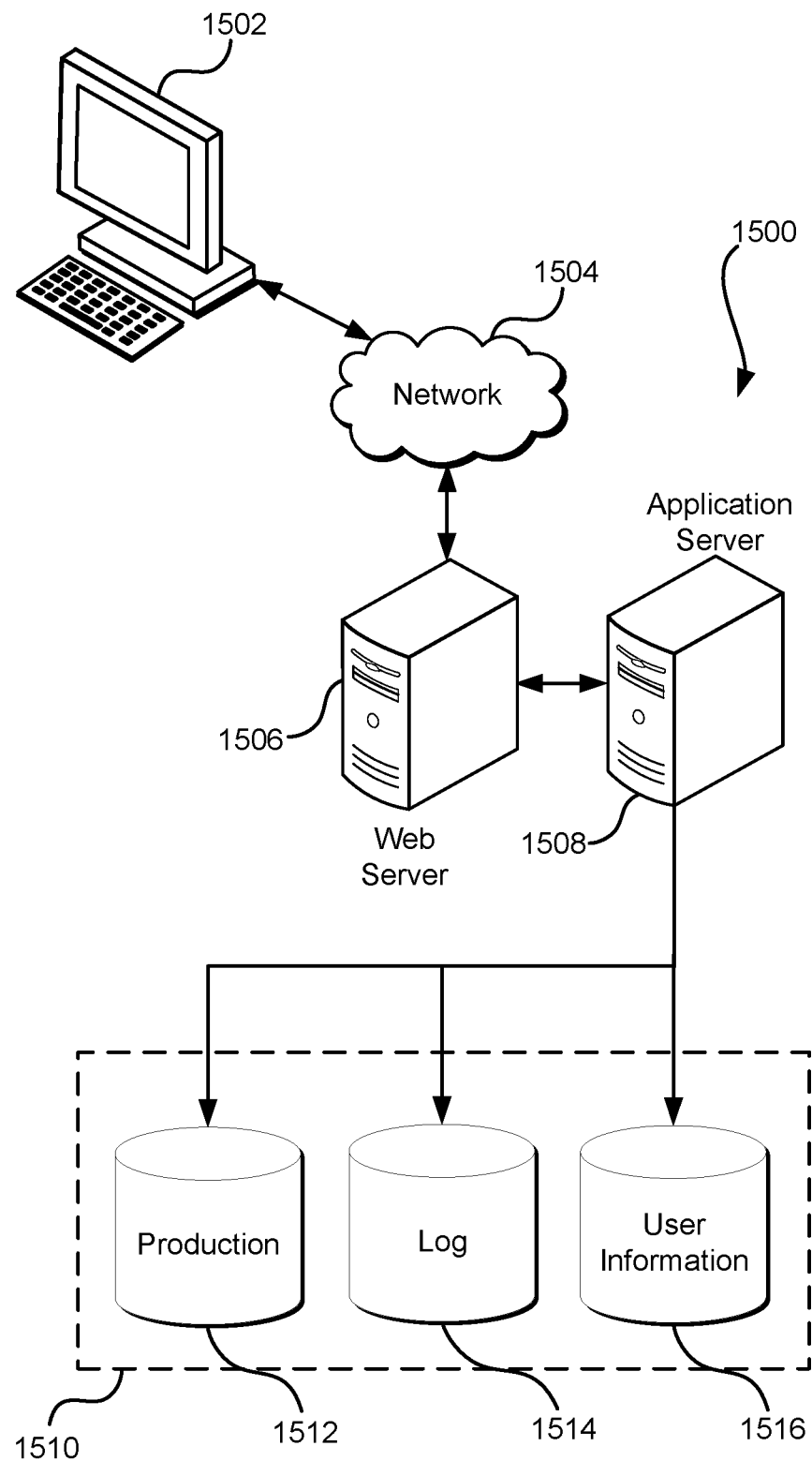
FIG. 15 illustrates an environment in which various embodiments can be implemented.

FIG. 15 illustrates an example environment 1500 for implementing aspects in accordance with various embodiments. As will be appreciated, although a web-based environment is used for purposes of explanation, different environments may be used, as appropriate, to implement various embodiments. The environment includes an electronic client device 1502, which can include any appropriate device operable to send and/or receive requests, messages, or information over an appropriate network 1504 and, in one embodiment, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In the example environment 1500 illustrated in FIG. 15, the network includes the Internet and/or other publicly addressable communications network, as the environment includes a web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers, or other elements, processes, or components, which may be chained or otherwise configured, which can interact to perform tasks such as obtaining data from an appropriate data store. Servers, as used herein, can be implemented in various ways, such as hardware devices or virtual computer systems. In some contexts, "servers" may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which are served to the user by the web server in the form of, for example, HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1502 and the application server 1508, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1510 can include several separate data tables, databases, data documents, dynamic data storage schemes, and/or other data storage mechanisms and media for storing data relating to a particular aspect of the present disclosure. In one embodiment, the data store illustrated includes mechanisms for storing production data 1512 and user information 1516, which can be used to serve content for the production side. The data store also is shown to include a mechanism for storing log data 1514, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update, or otherwise process data in response thereto. The application server 1508 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one embodiment, a user, through a device operated by the user, submits a search request for a certain type of item. In such an embodiment, the data store might access the user information to verify the identity of the user and access the catalog detail information to obtain information about items of that type. The information then can be returned to the user, such as in a results listing on a web page that the user is able to view via a browser on the user device 1502. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the example environment 1500 in FIG. 15 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In one embodiment, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol and Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In one embodiment, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media can, in an embodiment, comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium can store instructions. A main CPU can execute some of the instructions and a graphics processor unit can execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    recording, in an event queue, one or more changes made to entries in at least two database tables, wherein the entries include a first entry in a first database table and a second entry in a second database table, wherein the first entry and the second entry at least had a previously synchronized value;
    determining, based at least in part on a data type of the first entry and on the one or more changes, an aggregate change to the first entry that, as a result of being applied to the second entry, maintains data consistency between the entries; and
    synchronizing the second entry with the first entry by applying the aggregate change to the second entry.

2. The computer-implemented method of claim 1, wherein determining the aggregate change is based at least in part on a data configuration associated with the entry.

3. The computer-implemented method of claim 1, wherein synchronizing the second entry with the first entry includes storing a resolved value in each of the at least two database tables, the resolved value based at least in part on the aggregate change.

4. The computer-implemented method of claim 1, wherein synchronizing the second entry with the first entry includes applying a corresponding change to each of the at least two database tables, the corresponding change to the each of the at least two database tables based at least in part on resolving a difference between the aggregate change and a corresponding entry in each of the at least two database tables.

5. A system, comprising:
    memory to store computer-executable instructions that, as a result of execution, cause one or more processors of the system to:
        record a first one or more changes made to a first entry of a first database table;
        record a second one or more changes made to a second entry of a second database table, wherein the first entry and the second entry at least had a previously synchronized value;
        determine, based at least in part on a data type of the second entry and on the first one or more changes and the second one or more changes that are synchronized in to a finalized data, an aggregate change to the second entry; and
        update the second entry by at least applying the aggregate change to the second entry.

6. The system of claim 5, wherein the instructions that cause the one or more processors of the system to record the first one or more changes further include instructions that, as a result of execution, cause the one or more processors of the system to record the first one or more changes in an event queue.

7. The system of claim 5, wherein the instructions that cause the one or more processors of the system to record the second one or more changes further include instructions that, as a result of execution, cause the one or more processors of the system to record the second one or more changes in an event queue.

8. The system of claim 5, wherein the instructions further include instructions that, as a result of execution, cause the one or more processors of the system to update the first entry based at least in part the aggregate change.

9. The system of claim 5, wherein, as a result of updating the second entry, the value of the second entry and the value of the first entry match.

10. The system of claim 5, wherein:
the first database table and the second database table are two database tables of a plurality of database tables, the plurality of database tables including at least three database tables; and
corresponding entries in a majority of the plurality of database tables store matching values as a result of updating the value of the second entry.

11. The system of claim 5, wherein the instructions further include instructions that, as a result of execution, cause the one or more processors of the system to:
apply the first one or more changes to the first entry to produce a changed first entry;
apply the second one or more changes to the second entry to produce a changed second entry; and
determine an aggregate change based on resolving a conflict between the changed first entry and the changed second entry.

12. The system of claim 5, wherein the instructions further include instructions that, as result of execution, cause the one or more processors of the system to determine the aggregate change based at least in part on a time corresponding to each of the first one or more changes and to each of the second one or more changes.

13. A non-transitory computer-readable storage medium to store executable instructions that, as a result of execution by one or more processors of a computer system, cause the computer system to:
record one or more changes made to a first entry of a first database table, wherein the first entry of the first database table and a second entry of a second database table at least had a previously synchronized value;
determine, based at least in part on a data type of the second entry of the second database table and on the one or more changes, an aggregate change to the second entry that, as a result of being applied to the second entry, maintains data consistency between the first and second entry; and
update the second entry by at least applying the aggregate change to the second entry.

14. The non-transitory computer-readable storage medium of claim 13, wherein the instruction further include instructions that, as a result of execution by the one or more processors of the computer system, cause the computer system to update the first entry based at least in part the aggregate change.

15. The non-transitory computer-readable storage medium of claim 13, wherein the instructions that cause the computer system to record the one or more changes made to the first entry of the first database table include instructions that, as a result of execution by the one or more processors of the computer system, cause the computer system to record the one or more changes made to the first entry of the first database table in an event queue.

16. The non-transitory computer-readable storage medium of claim 13, wherein the instructions that cause the computer system to record the one or more changes made to the first entry of the first database table further include instructions that, as a result of execution by the one or more processors of the computer system, cause the computer system to determine the one or more changes based at least in part on monitoring network traffic received at a data storage service.

17. The non-transitory computer-readable storage medium of claim 13, wherein the instructions that cause the computer system to record the one or more changes made to the first entry of the first database table further include instructions that, as a result of execution by the one or more processors of the computer system, cause the computer system to determine the one or more changes based at least in part on monitoring one or more data streams received at the first database table.

18. The non-transitory computer-readable storage medium of claim 13, wherein the instructions that cause the computer system to record the one or more changes made to the first entry of the first database table further include instructions that, as a result of execution by the one or more processors of the computer system, cause the computer system to determine the one or more changes based at least in part on data received from an agent associated with a service of a computing resource service provider, the service configured to use the first database table to store data.

19. The non-transitory computer-readable storage medium of claim 13, wherein the instructions that cause the computer system to determine the aggregate change to the second entry further include instructions that, as a result of execution by the one or more processors of the computer system, cause the computer system to determine the aggregate change to the second entry based at least in part on a data configuration associated with the second entry.

20. The non-transitory computer-readable storage medium of claim 19, wherein the data configuration is specified by a user of the computer system.

* * * * *